(12) United States Patent
Zhang et al.

(10) Patent No.: US 7,589,760 B2
(45) Date of Patent: Sep. 15, 2009

(54) DISTRIBUTED PRESENTATIONS EMPLOYING INPUTS FROM MULTIPLE VIDEO CAMERAS LOCATED AT MULTIPLE SITES AND CUSTOMIZABLE DISPLAY SCREEN CONFIGURATIONS

(75) Inventors: Cha Zhang, Sammamish, WA (US); Bin Yu, Urbana, IL (US); Yong Rui, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 692 days.

(21) Appl. No.: 11/286,651

(22) Filed: Nov. 23, 2005

(65) Prior Publication Data

US 2007/0118868 A1 May 24, 2007

(51) Int. Cl.
*H04N 5/232* (2006.01)
(52) U.S. Cl. .................................. 348/211.12; 725/105
(58) Field of Classification Search .............. 348/14.07, 348/211.11, 213, 211, 211.12, 211.13, 211.1, 348/211.3, 153, 333.05
See application file for complete search history.

(56) References Cited

U.S. PATENT DOCUMENTS

| 5,956,076 | A * | 9/1999 | Hoess ......................... 725/118 |
| 6,400,401 | B1 * | 6/2002 | Morino et al. ............ 348/211.1 |
| 7,256,822 | B2 * | 8/2007 | Suga et al. ................ 348/211.3 |
| 2003/0020671 | A1 * | 1/2003 | Santoro et al. ................ 345/1.3 |
| 2004/0002049 | A1 * | 1/2004 | Beavers et al. .............. 434/350 |

OTHER PUBLICATIONS

Baecker R., A principled design for scalable internet visual communications with rich media, interactivity, and structured archives, *Proc. of the 2003 Conf. of the Centre for Advanced Studies on Collaborative Research*, Oct. 6-9, 2003, Toronto, Ontario, Canada, pp. 16-29.

Bianchi, M. H., AutoAuditorium: A fully automatic, multi-camera system to televise auditorium presentations, *Joint DARPA/NIST Smart Spaces Technology Workshop*, Jul. 1998, available at http://www.autoauditorium.com/nist/autoaud.html.

Cruz, G., and R. Hill, Capturing and playing multimedia events with STREAMS, *Proc. of 2nd ACM Int'l Conf. on Multimedia*, San Francisco, CA, 1994, pp. 193-200.

(Continued)

*Primary Examiner*—David L Ometz
*Assistant Examiner*—Ahmed A Berhan
(74) *Attorney, Agent, or Firm*—Lyon & Harr, LLP; Richard T. Lyon

(57) ABSTRACT

A computer network-based distributed presentation system and process is presented that controls the display of one or more video streams output by multiple video cameras located across multiple presentation sites on display screens located at each presentation site. The distributed presentation system and process provides the ability for a user at a site to customize the screen configuration (i.e., what video streams are display at any one time and in what format) for that site via a two-layer display director module. In the design layer of the module, a user interface is provided for a user to specify display priorities dictating what video streams are to be displayed on the screen over time. These display priorities are then provided to the execution layer of the module which translates them into probabilistic timed automata and uses the automata to control what is displayed on the display screen.

21 Claims, 19 Drawing Sheets

OTHER PUBLICATIONS

Kwaitkowska, M., G. Norman, R. Segala, and J. Sproston, Automatic verification of real-time systems with discrete probability distributions, *Theoretical Computer Science*, 2002, vol. 282, pp. 101-150.

Machnicki, E., and L. A. Rowe, Virtual Director: Automating a webcast, *Multimedia Computing and Networking 2002, Proc. IS&T/SPIE Symposium on Electronic Imaging: Science & Technology*, Jan. 2002, vol. 4673, pp. 208-225.

Rowe, L. A., P. Pletcher, D. Harley, and S. Lawrence, BIBS: A lecture webcasting system, *Technical Report*, Berkeley Multimedia Research Center, UC Berkeley, May 2001.

Rui, Y., A. Gupta, J. Grudin, and L. W. He, Automating lecture capture and broadcast: Technology and videography, ACM Multimedia Systems Journal, 2004, vol. 10, pp. 3-15.

* cited by examiner

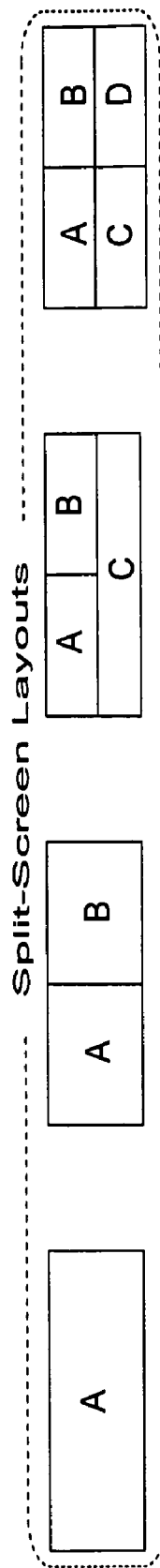
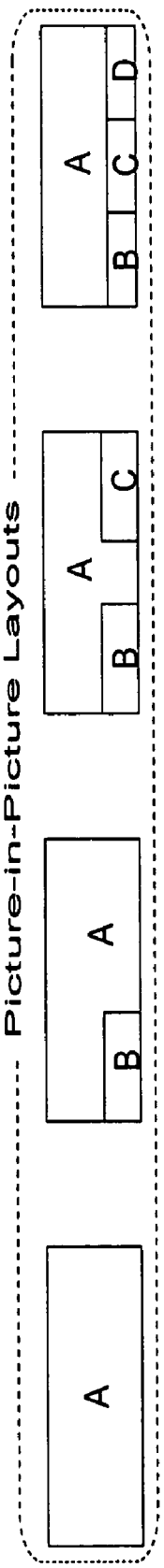

DISTRIBUTED PRESENTATIONS EMPLOYING INPUTS FROM MULTIPLE VIDEO CAMERAS LOCATED AT MULTIPLE SITES AND CUSTOMIZABLE DISPLAY SCREEN CONFIGURATIONS

BACKGROUND

In distributed presentations, there are multiple video cameras capturing a person, people or objects, such as a speaker or audience, across distributed sites where the presentation is being viewed. The video streams output by these cameras are presented on display screens at the various sites. However, how these streams are shown is a challenging problem. For example, showing all video streams on a screen at a site would reduce the screen space allocated for each video, and it would waste the screen space on streams not of interest to the audience at a site. Further, if particular ones of the available video streams are presented at any one time, rather than all, there is a question of what streams to show and in what configuration on the screen. There are existing presentation systems that automatically switch cameras views based on a predefined automata. However, this output is not customizable by viewers and typically not amenable to a distributed presentation setting.

One application of a distributed presentation scheme is a distributed classroom system. While it is not intended to limit the application of the present invention to a distributed classroom system, a description of these systems provides insight to the issues involved. Distributed classroom systems allow students to take classes remotely via computer networks, leading to wider and better educational opportunities. In distributed classroom applications, multiple classrooms are connected with a computer network. The lecturer stands in one of the classrooms (lecturer classroom), which may also have an audience, and other classrooms contain only an audience (audience classroom). The typical audio/video equipment configuration for such a distributed classroom setting includes one or more video cameras at each site that capture views of the audience. In addition, the lecturer classroom also has one or more video cameras for capturing views of the lecturer. To display the video streams, each lecturer or audience classroom is also equipped with one or more display screens, such as projector screens or plasma displays placed at the front of the classroom. These display screens typically show lecture slides, as well as views of the audiences not at the site and the lecturer.

When there are multiple participating sites as described above, multiple camera streams are available for display at each site. Hence there is a question as to which video streams to present on the local display screen and how to arrange the screen layout. Many systems have been proposed to manage the video streams intelligently. Generally, they can be classified into three categories. First, there are human operated systems. In these systems a human moderator is employed to conduct video switching between audience and lecturer videos streams, typically based on well-known cinematography principles. While these types of systems can provide high quality video switching and can allow customization of the presentation display at each site, they are expensive to deploy due to the manpower required.

There are also so-called "show-all" systems. These systems adopt the simple principal of presenting all available camera streams to the viewers at each site. The various video streams are typically presented in different sectors in a default split screen layout. Although this approach allows the viewer to decide what streams they want to watch, it has limitations. For example, if there are many streams being displayed, each sector's display resolution may be quite limited and the audiences sitting at the back of the room may not be able to see them clearly. In addition, because audiences normally focus on only one of the video streams, such as the video of the lecturer, most of the other streams are wasting valuable screen real estate and can be distracting to the audience.

The third category involves the use of automatic camera switching systems. Such systems automatically switch between multiple camera streams based on finite state automata. Each camera is represented by a state of the automata, and the switching of cameras is represented by transitions between the states. These transitions can be based on timers, such as "after showing the audience camera for 20 seconds, switch to the lecturer camera". They may also be based on events, such as "when there is some audience member starting to speak, switch to the audience camera showing that audience member". Such an approach is capable of producing high quality video productions by applying well-known cinematography rules automatically. However, to incorporate the cinematography rules in the video production, the automata often becomes very complicated. For example, some systems employ videography rules which are manually written as a cascade of switching rules in a script file. This is error prone, and changing the type or number of camera views presented would require the whole script to be rewritten. These existing systems also output a single video stream. However, it is desirable to be able to present multiple videos on the screen at the same time, using video effects such as Picture-in-Picture or split screen. Finally, the automatic camera switching scheme used by the existing systems prevents users (i.e., viewers or the system administrator) from customizing the video output based on their preferences.

SUMMARY

The present invention is directed toward a computer network-based distributed presentation system and process that controls the display of one or more video streams output by multiple video cameras located across multiple presentation sites. It is noted that while the foregoing limitations in existing distributed presentations schemes described in the Background section can be resolved by a particular implementation the present invention, it is in no way limited to implementations that just solve any or all of the noted disadvantages. Rather, the present invention has a much wider application as will become evident from the descriptions to follow.

The presentation system and process controls which of the various video streams are displayed at any one time on a display screen located at each presentation site, as well as where they are displayed on the screen. The display screens are each capable of simultaneously displaying more than one of the video streams in various display sectors of the screen. Each video camera can also capture more than one view of a presentation site (e.g., a global view or close-up view). The current view being captured is output as a video stream to a computer network. In addition, the video camera or cameras at a presentation site provide data to a display director program running as a module on a computing device that is in communication with the network. This data includes information about what view is currently being output to the network, as well as information about other views a camera may output. A different display director program module can be running on separate computing devices located at each presentation site. In that case, each display director controls the display screen at its site and receives the aforementioned video camera data from the local camera or cameras. The display director at a site then provides the aforementioned camera data to all the other director modules via the network so that each has knowledge about and can access all the videos stream being output to the network, as well as anticipate all the views the various cameras may capture. This knowledge is used by each display director module to determine, on an on-going basis, which of the video streams output to the computer network are to be displayed on the local screen and to select what sector of the screen the incoming video stream or streams are to be displayed. Alternately the display director module controlling a display screen at a presentation site may be running on a computing device located elsewhere. Still further, the display director functions could be consolidated into a single module that is capable of controlling the displays at multiple sites.

The display director module also provides the ability for a user at a site to customize the screen configuration (i.e., what video streams are display at any one time and in what format) for that site according to their own preference. The idea is to allow a user to decide what to see with some simple and intuitive interface, meanwhile producing complex and high-quality output videos automatically under the constraints given by the user. This is accomplished through the two-layer display director model that combines design-level score-based preference setup with run time automata-based execution. The design-layer interacts with the user, and the automata-based execution layer controls the display screen. More particularly, in the design layer, a user interface is provided for a user to specify display priorities (e.g., such as view importance, timing constraints, transition probability, composition scheme, and transition idioms) dictating what video streams are to be displayed on the screen over time and when. These display priorities are then provided to the execution layer which translates them into probabilistic timed automata and uses the automata to control what is displayed on the display screen over time and where on the screen it is displayed.

It should be noted that this Summary is provided to introduce a selection of concepts, in a simplified form, that are further described below in the Detailed Description. This Summary is not intended to identify key features or essential features of the claimed subject matter, nor is it intended to be used as an aid in determining the scope of the claimed subject matter. In addition to the just described benefits, other advantages of the present invention will become apparent from the detailed description which follows hereinafter when taken in conjunction with the drawing figures which accompany it.

DESCRIPTION OF THE DRAWINGS

The specific features, aspects, and advantages of the present invention will become better understood with regard to the following description, appended claims, and accompanying drawings where:

FIGS. 5(a)-(d) are diagrams showing exemplary display screen layouts for one through four screen sectors, respectively, employing a split screen format.

FIGS. 6(a)-(d) are diagrams showing exemplary display screen layouts for one through four screen sectors, respectively, employing a picture-in-picture format.

DETAILED DESCRIPTION OF THE PREFERRED EMBODIMENTS

In the following description of the preferred embodiments of the present invention, reference is made to the accompanying drawings which form a part hereof, and in which is shown by way of illustration specific embodiments in which the invention may be practiced. It is understood that other embodiments may be utilized and structural changes may be made without departing from the scope of the present invention.

1.0 Customizable Computer Network-Based Distributed Presentation System and Process The present computer network-based distributed presentation system and process controls the display of one or more video streams output by multiple video cameras located across multiple presentation sites on display screens located at each presentation site. The distributed presentation system and process also provides the ability for a user at a site to customize the screen configuration (i.e., what video streams are display at any one time and in what format) for that site via a unique two-layer display director module. In the design layer of the module, a user interface is provided for a user to specify display priorities dictating what video streams are to be displayed on the screen over time and when. These display priorities are then provided to the execution layer of the module which translates them into probabilistic timed automata and uses the automata to control what is displayed on the display screen. The overall architecture of the distributed presentation system will be described first follow by a description of the two-layer display director program module that lies at the heart of the system.

1.1 Overall Architecture

Figure 1:
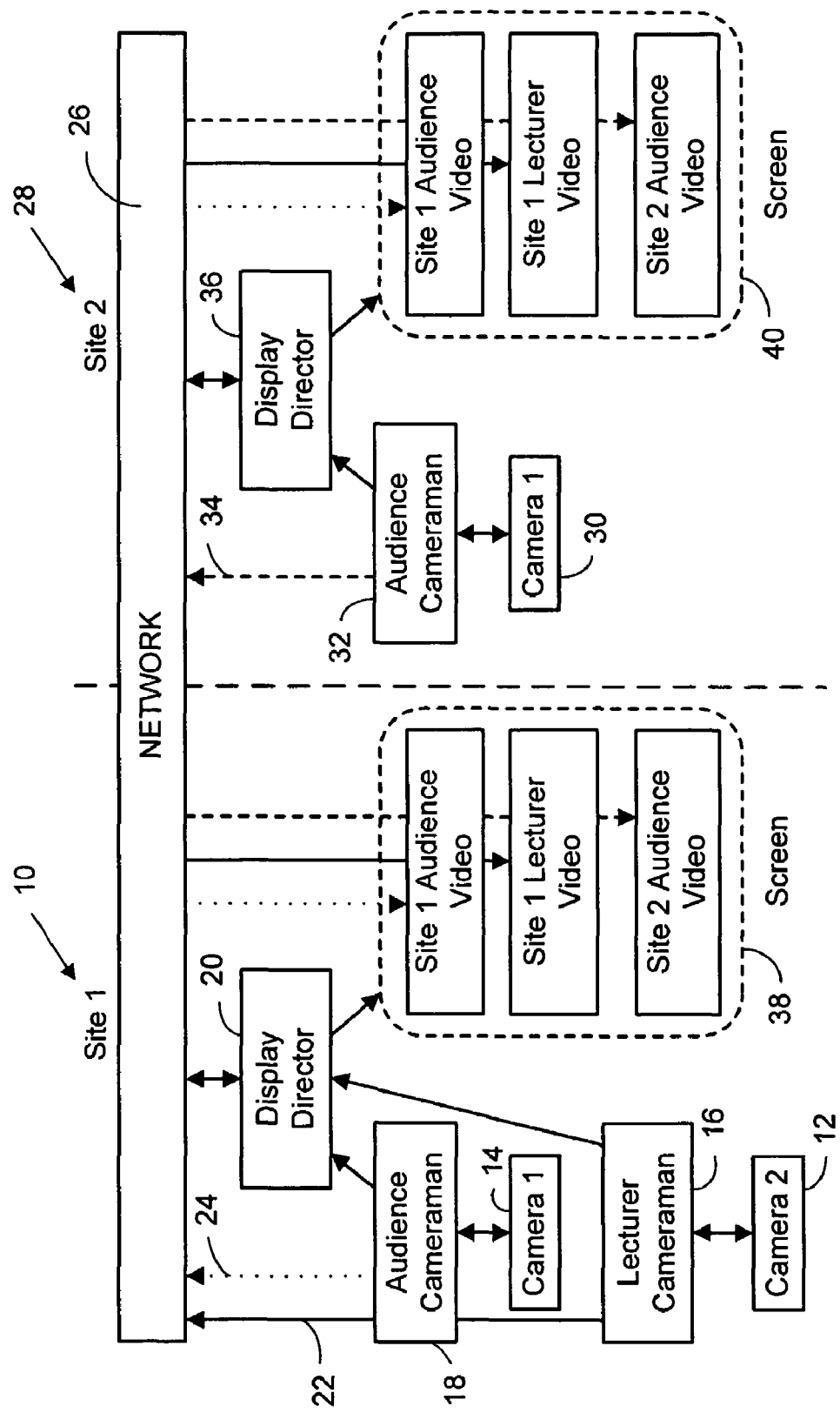
FIG. 1 is a diagram depicting an embodiment of the overall architecture for a computer network-based distributed presentation system according to the present invention, using an example setup of a two-way distributed presentation between two sites.

FIG. 1 illustrates one embodiment of an overall architecture for a computer network-based distributed presentation system according to the present invention, using an example setup of a two-way distributed presentation between two sites. In this example, a speaker is giving a lecture at the first site 10. There are two video cameras at the first site—one 12 capturing views of the lecturer and one 14 capturing views of an audience. Each camera 12, 14 is controlled by a virtual cameraman module 16, 18 operating on a computing device (not shown). The virtual cameramen modules act independently, both from each other, and a display director module 20 that will be described shortly. In essence, each virtual cameraman selects the view it is going to capture among a prescribed number of possible views and provides an output in the form of a video stream 22, 24 to a computer network 26. The virtual cameramen modules also provide information about the video stream to the display director module.

There is only one video camera located at the second site 28 in this example. This camera 30 captures views of an audience gathered at the second site 28. The second site camera 30 is also controlled by a virtual cameraman module 32. In one version of the presentation system architecture, the virtual cameraman module 32 associated with the second site 28 provides a video stream 34 to the computer network 26 and provides information about the stream to a display director module 36 associated with the site. This display director module 36 is different from the director module 20 associated with the first site in this example. However, there is two-way communications between the display director modules 20, 36 via the network 26. This allows sharing of the information about each captured video stream 22, 24, 34 between them. The video director module 20, 36 at each site 10, 28 controls a display screen 38, 40 at that site and can cause any of the captured video streams 22, 24, 34 to be downloaded from the network 26 and displayed on a screen at the site. It is noted that in the example shown in FIG. 1, all the available video streams 22, 24, 34 are displayed on each screen 38, 40, but this need not be the case. It is further noted that the display director module at a site can be resident on the same computing device as one or more of the virtual cameramen modules at that site, or a separate computing device. In other words, the virtual cameramen and display director modules at a site can each reside on a different computing device or share a computing device with one or more of each other.

In regard to the display director module, one of its specific duties is to maintain view information output by each cameraman module across all the sites. More particularly, each display director module keeps a table of all the cameramen modules (both local and remote), and keeps a record of the current view being output by each camera as reported by cameramen modules. Whenever any local cameraman module changes the view its associated camera is capturing, it will send a message to the local display director module to update its state. An example of this would be when a cameraman module whose camera is capturing views of the speaker changes from a global view of the front stage of a room to a close-up view of the speaker's head and shoulder. The display director module will then forward this message to the display director modules associated with other sites via the computer network. When a display director module receives such a message from a remote director module, it updates its local record table for the affected remote cameraman module.

The display director module is also responsible for automatic video sector switching. More particularly, each display director module controls the position of all the sectors presented on the display screen for its site. This includes the location (e.g., x and y coordinate of the left-top corner), size (e.g., width and height) and z-order (e.g., which determines whether a sector is placed on top of another sector or below it). The display director module makes the video switching decisions purely based on the current views reported by the cameramen modules and the local user's preference (as will be described shortly), independent of other display director modules. For example, for the two-site scenario shown in FIG. 1, the display director module 20 associated with the first site 10 may play the video stream 34 of the audience camera 30 from the second site 28 to full screen, overlay the speaker's video stream 22 on top of it, and not display the local audience camera's video stream 24 at all. Meanwhile the display director 36 associated with the second site 28 could switch between the two video streams 22, 24 coming from the first site 10 or show them in split screen mode, while not playing the video stream 34 from the local camera 30.

It is noted that while only two sites are shown in the example of FIG. 1, the overall architecture can include more audience sites configured in the same way as the above-described second site. In addition, while the example of FIG. 1 shows only one camera and cameraman module combination is dedicated to capturing views of the speaker at the first site and only one camera and cameraman module combination is dedicated to capturing views of the audience at each site, this need not be the case. Multiple camera-cameraman module combinations can be assigned to each person, group or object of interest at each site. In addition, it is possible for a presentation site to display video streams from other sites, but not have a camera providing video from that site.

2.0 The Computing Environment

Figure 2:
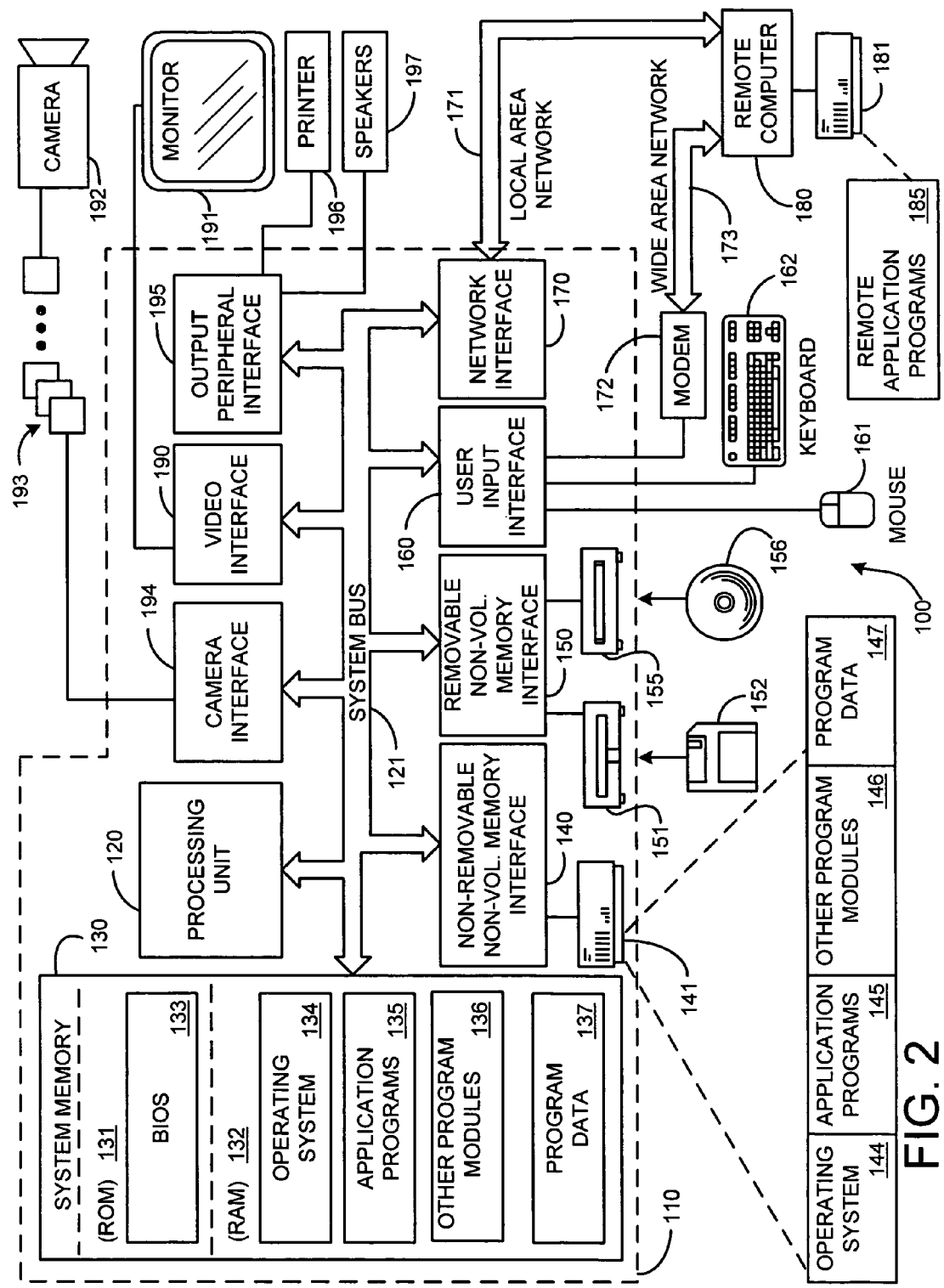
FIG. 2 is a diagram depicting a general purpose computing device constituting an exemplary system for implementing the present invention.

Before providing a description of embodiments of the two-layer display director according to the present invention, a brief, general description of a suitable computing environment in which portions of the display director may be implemented will be described. FIG. 2 illustrates an example of a suitable computing system environment 100. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 2, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 2 illustrates operating system 134, application programs 135, other program modules 136, and program data 137.

The computer 110 may also include other removable/non-removable, volatile/nonvolatile computer storage media. By way of example only, FIG. 2 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 2, provide storage of computer readable instructions, data structures, program modules and other data for the computer 110. In FIG. 2, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195. A camera 192 (such as a digital/electronic still or video camera, or film/photographic scanner) capable of capturing a sequence of images 193 can also be included as an input device to the personal computer 110. Further, while just one camera is depicted, multiple cameras could be included as input devices to the personal computer 110. The images 193 from the one or more cameras are input into the computer 110 via an appropriate camera interface 194. This interface 194 is connected to the system bus 121, thereby allowing the images to be routed to and stored in the RAM 132, or one of the other data storage devices associated with the computer 110. However, it is noted that image data can be input into the computer 110 from any of the aforementioned computer-readable media as well, without requiring the use of the camera 192.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 2. The logical connections depicted in FIG. 2 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 2 illustrates remote application programs 185 as residing on memory device 181. It will be appreciated that the network connections shown are exemplary and other means of establishing a communications link between the computers may be used.

The exemplary operating environment having now been discussed, the remaining parts of this description section will be devoted to a description of the two-layer display director module.

3.0 Two-Layer Display Director Module

In the design of a display director module it is desired that it satisfy two key properties: simplicity and expressing power. On the one hand, an average user should be able to understand how the automatic camera switching works by simply looking at a display director user interface, and be able to customize the display director functions. If a real-world human director producing a presentation is considered, he or she would continuously cut between camera views by comparing all the currently available views and selecting the most interesting one. Ideally, the display director module according to the present invention should be doing the same type of comparison, only that the comparison criterion (such as which camera view is most important and interesting) is specified by the users. Therefore, an intuitive display director control interface would be based primarily on importance and interestingness scores. Of course, a human director also needs to pay attention to cinematography rules to render high quality presentation, which might sometimes require the aforementioned score to be overruled (at least temporarily). These rules can be accommodated as constraining parameters to the score comparison-based scheme.

While the user would view the choice of views to be shown intuitively based on importance and interest, from the display director module's perspective, it requires finite state automata to execute the video switching at run time. More particularly, the display director module needs to maintain the past and current "state of execution". In other words, it needs to know the currently available camera view being output by each of the cameras across all the sites, what views are currently being shown on the display being controlled and in what configuration, and the time these views were first displayed. Based on this state information, the display director module looks for matching "transitions" from the current state to other states. Each of the transitions is a "switching rule" specifying the change that is to be made from one state to another and when the change is to be made. A change in state could be triggered by a camera view change, or timing constraint (e.g., minimum and maximum time to stay at a state), or some other criteria. For example, the transition rules may be: if a current state of camera X has not changed for over 25 seconds, switch to any other camera view; or if camera Y changes to view Z, switch to show camera Y's new view.

Thus, there is a gap between the user's authoring intuition and display director's execution requirement. If the users were required to specify the whole automata directly, it would be too complicated; but if the user intuition level is employed, the display director module will not know how to implement it. The solution is the creation of a unique two-layer display director module.

Figure 3:
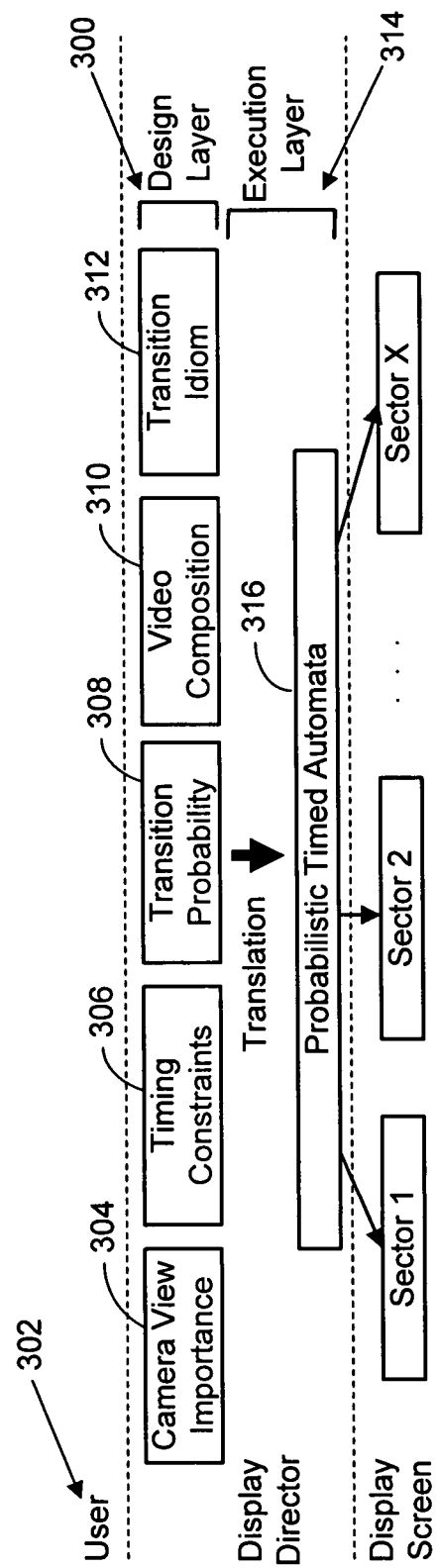
FIG. 3 is a diagram illustrating an embodiment of the two-layer display director program module according to the present invention which serves as a liaison between the users (e.g., system administrators or viewers) and the final video production shown on the display screen.

The two-layer display director module serves as a liaison between the users (e.g., system administrators or viewers) and the final video production shown on the display screen. FIG. 3 provides a graphical representation of one embodiment of this two-layer design. The design layer 300 of the display director module interfaces with the user 302 directly, where the user can fully customize the parameters of display director functions in five categories. These categories include camera view importance 304, timing constraints 306, transition probability 308, video composition 310 and transition idiom 312. The user-specified settings in the aforementioned categories are then translated in the execution layer 314 into probabilistic timed automata 316. This automata dictates which video streams are displayed on the screen, as well as the screen layout.

Figure 4:
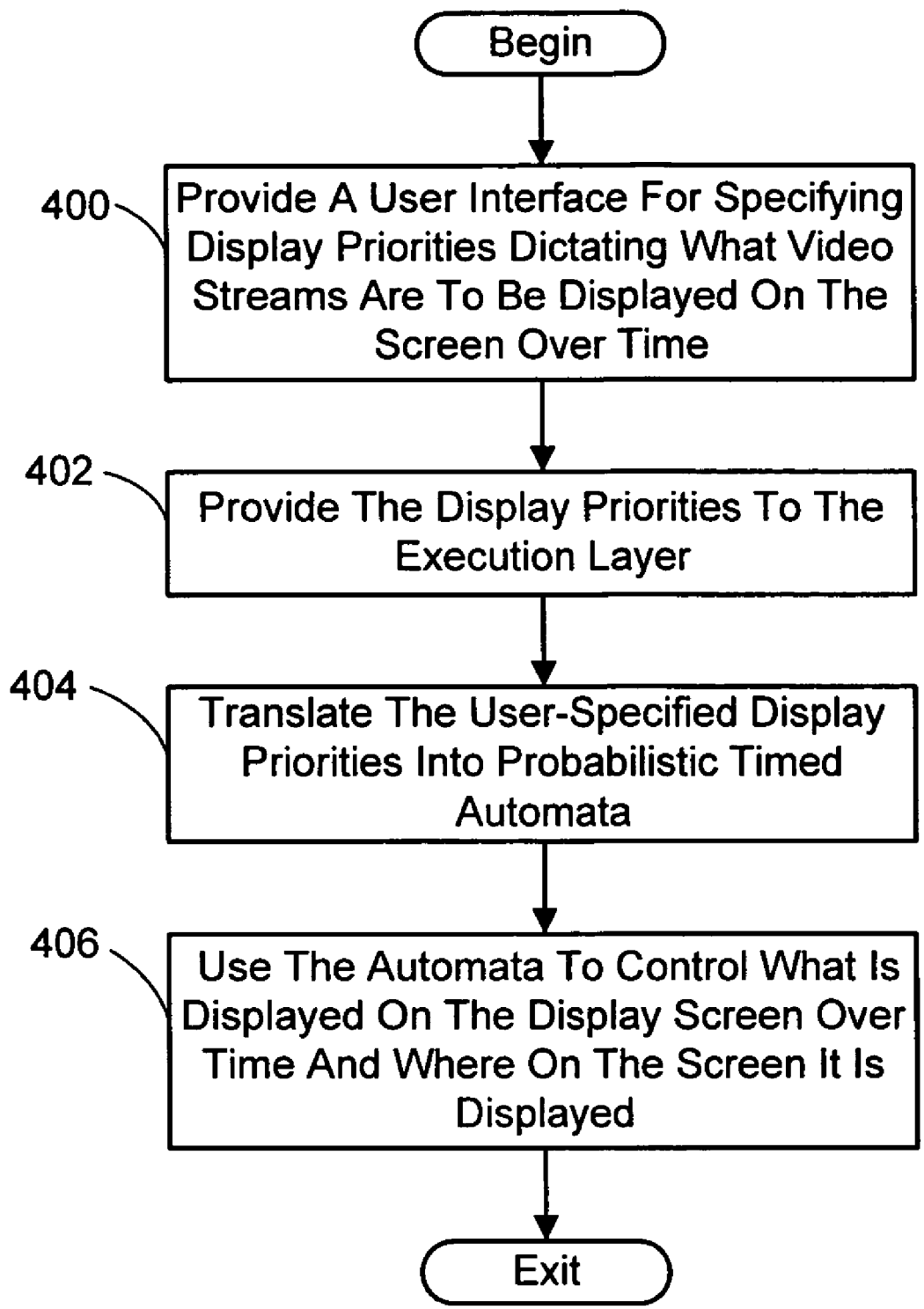
FIG. 4 is a flow chart diagramming a process for controlling a display screen using the two-layer display director module illustrated in FIG. 3.

Generally, referring to FIG. 4, in the design layer of the two-layer display director module, a user interface is provided for a user to specify display priorities dictating what video streams are to be displayed on the screen over time and when (process action 400). The design layer also provides the display priorities to the execution layer of the display director module (process action 402). In the execution layer, the user-specified display priorities are translated into probabilistic timed automata (process action 404) and the automata is used to control what is displayed on the display screen over time and where on the screen it is displayed (process action 406).

3.1 Design Layer of Display Director Module

As stated above, the design layer of the two-layer display director module provides a user interface for a user to specify various display priorities and then provides these display priorities to the execution layer. In tested embodiments of the display director module, the display priorities included camera view importance, timing constraints, transition probability, video composition and transition idioms. Each of these display priority categories will now be described, along with an example of a user interface that could be used to enter them.

3.1.1 Importance Score

A user (e.g., system administrator or viewer) at a site assigns a score to each possible view from all the cameras across all the sites to define the level of importance of each view. This is accomplished with a user interface to the design layer of the display director module. For example, in tested embodiments a graphical user interface was produced by the director module. An example of this interface will be described shortly. It is possible for the user to assign a numerical score to each view, such as a number between 0 and 100. However, in tested embodiments of the present invention it was found that a simpler, three-level scoring scheme provided a more intuitive way for a user to define the importance and interest of a view. More particularly, the scoring scheme included a "must show" level that represents the highest degree of importance and interest. A camera view assigned this level should be presented on the display screen most of the time. The next lower level is the "rotation" level. The camera views assigned this level can be shown in rotation if space on the screen is available. Finally the lowest level is the "don't show" level. Camera views assigned this level should not be put on the screen unless there is nothing else to show.

3.1.2 Timing Constraints

The user at a site also assigns timing constraints to each possible view from all the cameras across all the sites via the aforementioned user interface, More particularly, for each camera view, if it is put on screen, there will be a minimum time that the user wants the view displayed to avoid too frequent changes in screen output or to enjoy that camera view for at least a specific length of time. The user specifies the desired minimum time and whenever the minimum time expires for the current camera view, the display director module will decide which camera view to switch to, unless the displayed view is assigned the highest priority (e.g., "must show" priority). These high priority views are handled using a maximum time that the user also specifies. This maximum time represents the longest desired period that a view is to be shown before at least temporarily switching to a different view to add some variation into the final production. There will be exceptions to this maximum time constraint as will be described shortly in connection with transition probability.

In one embodiment of the design layer, default time constraint values are employed (e.g., 10 seconds as the minimum time and 120 seconds as the maximum time). The user can let these values stand or customize them using the aforementioned user interface. Note that the maximum time may contradict with the score comparison-based video switching. For example, suppose that a close-up view of a speaker is assigned a "must show" score. Suppose after it has been shown for its maximum time, it remains the top ranking camera view. The display director module would choose to continue showing this view according to the score setting. To solve this conflict, in such cases the display director will temporarily display another camera view. After the minimum timer expires for the newly selected view, the display director module would once again display camera view's based on their scores. Thus, the previous view would be returned to the display screen.

3.1.3 Transition Probability

The user at a site will additionally assign a transition probability to each possible view from all the cameras across all the sites via the aforementioned user interface. The transition probability is introduced to bring more variation into the final screen output. In some situations, when there are no camera view changes, the camera switching will be purely based on the maximum time constraints, and the currently displayed camera views will be replaced with alternate views for the specified minimum time. This results in the views changing at fixed intervals, which may be distracting to the viewers. To avoid this monotony, the user-specified transition probability is employed when the display director decides whether to change a displayed view that has reached its assigned maximum time. In tested embodiments of the design layer, the transition probability is specified by the user entering a number in a range that is greater than 0, but less than or equal to 1. This number represents the percentage of time that a scheduled change is made. For example, if the transition probability value for a displayed view is 0.5, then on average, whenever the assigned maximum time has expired, this view will remain displayed half of the time. If the transition probability assigned to a view dictates that the view remain displayed even though it has reached its maximum time constraint, the timer is reset. Thus, if the view is one of the highest priority views, it would not be considered for change again (barring some user-specified transition idiom or camera view change as will be described shortly) until its maximum time has expired once more.

It is noted that when there are multiple video streams shown at the same time in various sectors of the display screen, each potentially having a different maximum time constraint, the result could be the frequent and asynchronous changing of the views shown in the individual sector if changes are handled on a sector by sector basis. This could be distracting to the viewers. Accordingly, as will be described shortly, in tested embodiments of the display director module, the individual sectors are treated as a unitary screen configuration. In this way, when a maximum time constraint is reached, the decision of what to show on the screen next is done for all the sectors at once. To this end, as will be described later, the smallest maximum time constraint value assigned among all the displayed views is taken as the maximum time constraint for the screen configuration as a whole.

3.1.4 Video Composition

The display director can display multiple video streams in different sectors of the display screen it is controlling. Thus, it must first determine the configuration of the sectors on the screen based on the user inputs. Any type of screen layout can be supported. However, in tested embodiments of the display director module, two types of screen layout are supported— namely a split screen format such as shown in FIG. 5(a)-(d) and a picture-in-picture format such as shown in FIG. 6(a)-(d). In each of these layouts the number of sectors shown on the screen progressively increases from 1 to 4(i.e., sectors A through D). It is noted that while these examples only go up to four sectors, more are also possible.

The user need only designate the format desired (e.g., split screen or picture-in-picture) via the user interface. The display director module does the rest. More particularly, the director module causes each camera view designated by the user as being of a "must see" priority to be displayed in a sector of the display.

Whenever a "must see" priority view is scheduled to be removed from the current display configuration because it has reached its maximum time constraint and its transition probability does not prevent it from being removed, the display director module will replace the view with a randomly chosen alternate view. This replacement view may be a lower priority "rotation" view if there are no high priority views that are not already displayed. However, if there are no "must see" or "rotation" priority views that are not already displayed on the screen, then the director module would replace the expired view with a "don't show" priority view. As indicated previously, in tested embodiments the screen configuration as a whole is changed. In this case, the result would be for the selected alternate view to be displayed on the entire screen by itself. This replacement view would remain displayed until its minimum time constraint is reach and then the highest priority views (that are not currently being displayed) would be displayed instead. Typically, this results in the previously displayed screen configuration being restored to the screen.

It is noted that a particular sector can also be dedicated to a particular "must see" priority view. In other words, when such a view is shown it is always shown in its designated sector. For example, the largest and/or most prominent sector on the screen could be dedicated to a view of a speaker giving the presentation.

3.1.5 Transition Idioms

In the filming industry, an idiom is a predefined camera switching scheme for filming a particular type of live scene. For example, one idiom may specify that to capture a two-person conversation, an overview shot of the two persons is shown first, and then the view switches between frontal shots of each person's face. While such complex idioms are not practical or even desirable in an automatic camera switching system application such as the present invention, there may be some simple cases where the user does want to have some way to specify particular camera switching rules. Without this capability the switching would be entirely based on the timing constraints and transition probabilities, and the user would not be able to control what replacement views are shown. Therefore, the display director module can be configured to allow the user to add transition idioms using the aforementioned user interface. More particularly, the user at a site can specify a transition idiom in the following form: if a current camera view has been view X for over m seconds, and the last camera view was Y, then switch to a view currently being captured by camera Z for at least n seconds. It is noted that view X could be specified as any view and camera Z could be specified as any camera, so as to add flexibility to the transition idioms that are created. It is also noted that these user-specified idioms take precedence over the importance score-based video switching, because some idioms may require the display director module to switch from a high score camera view to a low score one.

3.1.6 Design Layer User Interface

Figure 7:
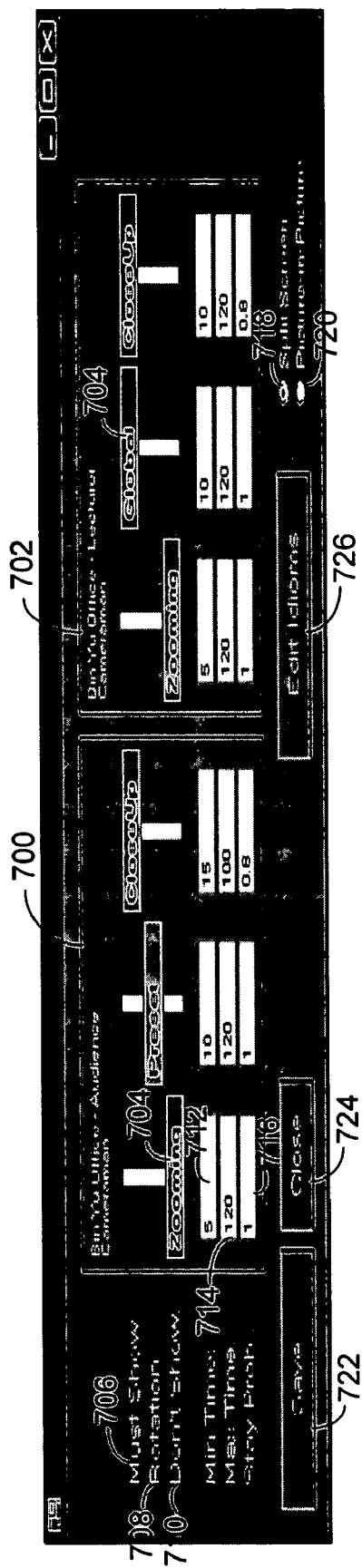
FIG. 7 is a screen shot image of an exemplary graphical user interface which allows a user at a site to input display priorities into the design layer of the two-layer display director module.

As described previously, tested embodiments of the display director module employed a graphical user interface to allow the user at a site to input the foregoing design parameters. FIG. 7 is an example of such an interface. Other interfaces, graphical or otherwise, could also be employed-however, the example shown in FIG. 7 illustrates how easily a user can input the desired parameters in an intuitive way.

In the example interface of FIG. 7, each of the possible camera views that the cameramen modules at all the sites have reported are shown as sliding bars 704. The label on each bar 704 indicates the type of view it represents. In addition, the views attributable to a particular cameraman module are boxed off to clearly distinguish the cameras involved from each other. For instance, in the example interface shown in FIG. 7, sliding bars 704 representing views that the cameraman module providing a video stream of an audience at a site is seen in the left-hand side box 700 and sliding bars 704 representing views that the cameraman module providing a video stream of a lecturer at the site is seen in the right-hand box 702. The audience cameraman module in this example has reported it will provide one of three different views of the audience—namely a close-up view, a preset view (e.g., a prescribed view showing the entire audience) and a zooming view. The zooming view refers to a shot of the audience as the camera zooms from a close-up to the wider audience view, or vice versa. In the case of the lecturer cameraman module, it has reported that it will either provide a close-up view of the lecturer, a more global view of the site looking toward the lecturer, or a view zooming between the two other views. The user inputs importance scores by sliding each view bar 704 to either the "must show" position at the top 706, the "rotation" position in the middle 708 or the "don't show" position at the bottom 710. For example, in the case of the lecturer camera, the user has designated that the close-up and global views are highest priority and so should be displayed whenever available, subject to other constraints such as timing, transitional priority, display configuration and any user-specified idioms that affect these views. In addition, the user has designated that the zooming view is lowest priority an should not be shown unless there is no other view available for display as described previously.

The user also inputs values for the minimum and maximum time constraints for each view, as well as the desired transition probability in the text entry boxes 712, 714, 716 located below the sliding bar 704 associated with each view. In the example interface shown in FIG. 7, these boxes 712, 714, 716 are initially filled with default values, which in this case are 10 seconds for the minimum time, 120 seconds for the maximum time and 1 for the transition probability. The user simply replaces the default value if a different value is desired. For example the user in the example shown in FIG. 7 has changed the parameters for the close-up view associated with the audience camera so that the minimum time constraint is 15 seconds, the maximum time constraint is 100 seconds and the transition probability is 0.8.

The user also selects whether the display screen at the site is to be configured in split screen fashion or as picture-in-picture by selecting one or the other of the labels 718, 720 at the bottom, right hand side of the interface. A dot appears adjacent the selected option. The user can save to current setting by selecting the "Save" button 722, and can close the interface by selecting the "Close" button 724.

Figure 8:
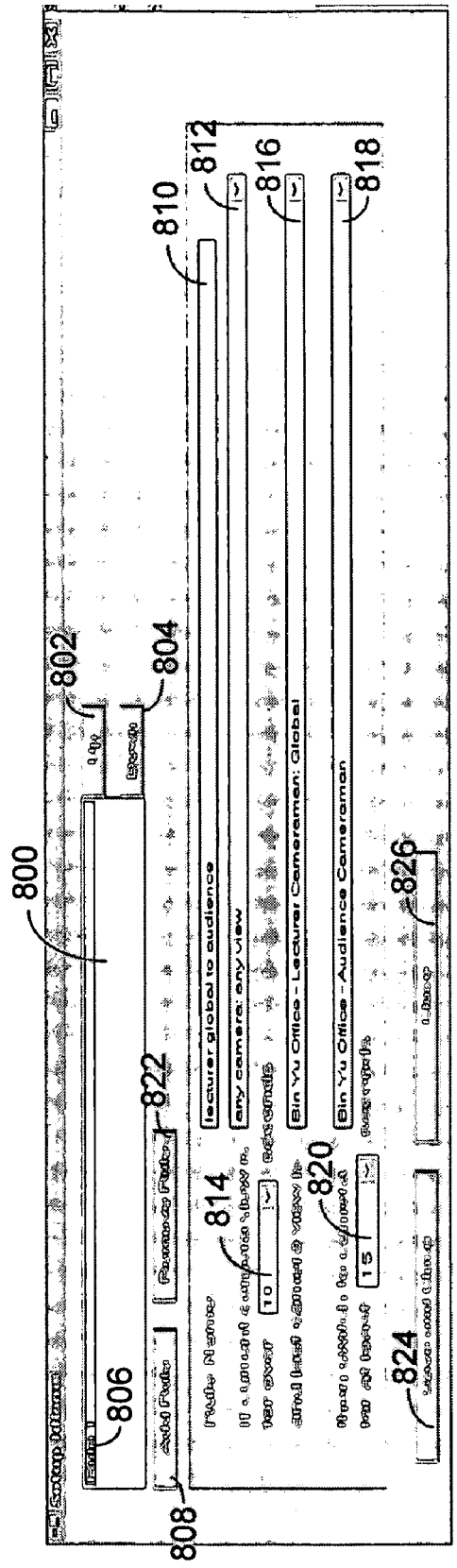
FIG. 8 is a screen shot image of an exemplary graphical user interface which allows a user at a site to enter transition idioms into the design layer of the two-layer display director module.

The user can additionally create transition idioms if desired by selecting the "Edit Idioms" button 726. Selection of this button 726 would open a secondary interface, such as the example shown in FIG. 8. In this example, the idioms created by users at a site are listed in the text box 800 at the top of the interface. "Up" and "Down" buttons 802, 804 adjacent to this text box 800 can be selected to scroll the list up or down should all the idioms not fit in the space provided. In the example shown in FIG. 8, only one idiom 806 (labeled "Rule 1" by the user) is listed. The user can add a new idiom by selecting the "Add Rule" button 808. Selecting this button 808 clears the text entry boxes displayed in the middle portion of the interface. The user then enters the desired idiom specifics in these boxes. More particularly, the user enters a name for the new idiom in the box labeled "Rule Name" 810. In the example shown in FIG. 8, the user is entering a new idiom that is to be named "lecturer global to audience". This title will eventually be displayed in the aforementioned list of idioms in the text box 800. The user also fills in the box 812 labeled "If current camera view is" to indicate the view that is to be changed in the idiom. In the example shown, the user has entered a global designator, i.e., any camera:any view. This indicates that any displayed view provided by any of the cameramen modules is to be changed under the specified circumstances. The circumstances are entered by the user in the next two boxes 814, 816 labeled "for over _____ seconds" and "and last camera view is", respectively. In the example, the user entered 10 seconds and "Lecturer Cameraman:Global", respectively, into these two boxes 814, 816. This indicates that any view in the current screen configuration that has been displayed for over 10 seconds is to be changed if the last screen configuration displayed matches exactly with the specified view (that is, it shows and only shows the global view provided by the lecturer cameraman module). The user additionally enters what view the current screen configuration is to be changed to if the foregoing circumstances arise. This information is entered in the box 818 labeled "then switch to camera". In this example, the user has entered "audience cameraman" to indicate that the current view is to be switched to whatever view the audience cameraman module is providing at the time. Finally, the user enters how long the new view is to be displayed in the box 820 labeled "for at least _____ seconds". In the example, the user has entered 15 seconds. Once the time expires, the display director module will return to its normal running condition, and re-calculate a new output choice based on the scores of all the current views of all cameraman modules.

At this point the user can create another transition idiom by selecting the "Add Rule" button 808 again. The title of the just created idiom would appear in the idiom list box 800 and the text entry boxes 810, 812, 814, 816, 818, 820 are cleared and ready to accept new entries. A user can further remove or edit an existing idiom by selecting it in the idiom list box 800. The entries associated with the selected idiom would appear in the text boxes 810, 812, 814, 816, 818, 820. The user can then change them as desired, or can select the "Remove Rule" button 822 to clear the entries and remove the idiom from the list. Finally, the user exits the example idiom creation interface by selecting the "Save and Close" button 824 if the new entries or edits are to be retained, or selecting the "Close" button 826 to exit without saving.

3.2 Execution Layer of The Display Director Module

The execution layer of the display director module takes the display priorities entered by a user at a site and generates the probabilistic timed automata needed to control the display screen. This translation is accomplished by creating a series of state and transition tuples. These state and transition tuples are then used to control what is shown on the display screen at a presentation site, as will be described in the following sections.

3.2.1 State Tuples

In general, a state tuple describes a display screen configuration in regard to what views are displayed, where they are displayed on the display screen and for how long, and what views are currently available from the various cameras at all the presentation sites. Each state in the automata is represented by a state tuple. In one embodiment the state tuple takes the form of:

S=<View_List, Selection_List, SL, Max, Min>, where $View_{13}$ List=$[V_1, \ldots V_N]$ represents a list of the current views of the N cameras present across all the sites, Selection_List=$[C_1, C_k]$ represents the list of K cameras whose outputs from the view list are selected for display, SL represents the selected screen layout, and Max and Min fields represent the maximum and minimum time to stay in the state. If there are N cameras, and the number of views of each camera is $M_1, M_2 \ldots M_N$, then the total number of possible camera view combinations is $M_1 * M_2 \ldots * M_N$. For each of these combinations, two state tuples are generated and added to the automata, namely a normal state tuple and a random state tuple. For the normal state, the selection list is determined using the previously-described scores associated with the views listed in the view list of the state tuple. In the embodiment of the display director module described previously with a three-tier scoring scheme, the camera views having a "must show" priority become the selection list (or at least as many as possible given the maximum number of display sectors). For the random state, the Selection_List is set to RANDOM meaning that the selected camera output can be any of the views listed in the view list chosen randomly. The SL value is set according to type of screen layout the user designated (e.g., split-screen or picture-in-picture) and the number of cameras K in the Selection_List. In one embodiment, the screen is divided into as many sectors as there are camera views identified in the selection list. In addition, layout (e.g., size and location) of each sector, as well as which sector each of the views will be shown, is established. This may be done using prescribed criteria, such as tiling the screen equally for all the camera views to be displayed, or allocating the full screen area to a designated one of the top scoring camera streams and then overlay other camera streams at the bottom of the screen as picture-in-picture views. The criteria can be hard coded, or it could be specified by the user. For example, the user can decide that the lecturer's view will always be the largest one in picture-in-picture mode. The Min field is set to the largest value among the minimum time constraints assigned to the views output by the cameras on the Selection_List; while the Max field is set to the smallest value among the maximum time constraints assigned to the views output by the cameras on the Selection_List. For a random state tuple, the Min and Max fields are based on the Min and Max setting of the view that is randomly selected at runtime and so are left open until the selection is made.

3.2.2 Transition Tuples

In general, a transition tuple specifies the conditions under which a displayed screen configuration is to be changed to another screen configuration. Each transition in the automata is represented by a transition tuple. In one embodiment the transition tuple takes the form of:

T=<Type, $S_{last}$, $S_{current}$, C_List, V_List, D, P, $S_{next}$>.

The Type field is set to either "Time" or "View", the $S_{last}$ field identifies the last state, the $S_{current}$ field identifies the current state, the $S_{next}$ field identifies the next state to be transitioned to after the state identified in the $S_{current}$ field, the D field refers to various time periods as will be described shortly, and the P refers to the transition probability from current state $S_{current}$ to next state $S_{next}$. The C_List and V_List represent the difference in View_Lists of two states as will be described shortly.

If the Type field is set to "Time", the transition tuple means that if the last state was $S_{last}$ and the current state is $S_{current}$, and screen configuration associated with the $S_{current}$ state has been displayed for D seconds, then the current screen configuration is switched to that associated with state $S_{next}$ (depending on probability P in some cases). If the Type field is set to "View", the transition tuple means that if the last state was the state identified in the $S_{last}$ field and the current state is that identified in the $S_{current}$ field, and the screen configuration associated with the state identified in the $S_{current}$ field has been displayed for at least the time period listed in the D field, then when the cameras listed in the C_List field change their views to those listed in the V_List field, the screen configuration is switched to that associated with the state identified in the $S_{next}$ field.

The transition tuples are added to the automata in two steps. First, for each pair of state tuples that have different camera view combinations, two view-type transition tuples are generated and added to the automata. These view-type tuples represent the state transition (i.e., the new screen configuration) caused by camera view changes. The C_List and V_List fields are determined by the difference in the View_List between the two states involved. More particularly, the views listed in the view lists of the two state tuples that are common to both are eliminated and what is left over in the first of the state tuples becomes the V_List field of the first view-type transition tuple being generated, and what is left over in the second of the state tuples becomes the V_List field of the other view-type transition tuple being generated. The C_List field in each of the transition tuples being generated is simply the indexes of cameras that output the view or views contained in the V_List field of that tuple. The P field is left blank in a view-type transition tuple. And finally, the D field of each view-type tuple being generated is set to the value listed in the Min field of the state identified in its $S_{current}$ field, so that camera view changes that happen before the minimum time will not trigger a view-type transition.

The second step in adding transition tuples to the automata involves, for each pair of state tuples that have the same camera view combination (i.e., normal-random pairs), a time-type transition tuple is generated to transition from the normal state to the random state. Thus, the $S_{current}$ field identifies the normal state tuple of the pair under consideration and the $S_{next}$ field identifies the random state tuple of the pair. Additionally, in this case, the D field is set to the value listed in the Max field of the normal state tuple under consideration, and the P field is set to the smallest transition probability value assigned by the user among the camera views associated with the cameras listed in the selection list of the normal state tuple under consideration. A second time-type transition tuple is also generated to transition from the random state to the normal state. Thus, the $S_{current}$ field identifies the random state tuple of the pair under consideration and the $S_{next}$ field identifies the normal state tuple of the pair. In this case, the P field is not applicable and so is left blank, and the D field is set to the value listed in the Min field of the random state tuple under consideration.

The third step in adding transition tuples to the automata involves, for each transition idiom specified by the user (if any), a pair of time-type transition tuples are generated to transition from and back to a current state. The first of the time-type transition tuples has the following attributes. The Type field is set to IDIOM and the $S_{current}$ field identifies the state tuple corresponding to the screen configuration specified by the user as the current view when the transition idiom was created. Likewise, the $S_{last}$ field identifies the state tuple corresponding to the screen configuration specified as the last view, and the $S_{next}$ field identifies the state tuple corresponding to the screen configuration specified as the view that is to be switched to if the other conditions are met. C_List and V_List are not used in an idiom-based time-type transition tuple and so are left blank. Additionally, in this case, the D field is set to the value specified by the user which dictates how long the aforementioned current view is to be shown before switching. In the embodiment of the user interface for entering transition idioms described previously, there was not provision for specifying a transition probability. In such a case, the P field is set to 1.0. However, in an alternate embodiment, the user would be able to specify a transition probability as well. In this latter case, the P field is set to the specified value.

In regard to the second time-type transition tuple generated for a transition idiom, the following attributes apply. The Type field is set to IDIOM, and in this case the $S_{current}$ field identifies the state tuple corresponding to the screen configuration specified by the user as the view that is to be switched to in the transition idiom. The $S_{last}$ field identifies the state tuple corresponding to the screen configuration specified as the current view when the transition idiom was created, as does the $S_{next}$ field. In this way the screen configuration reverts to the one shown prior to implementing the first transition tuple of the pair. Here again, the C_List and V_List are not used and so are left blank. The D field is set to the value specified by the user which dictates how long the aforementioned view that is to be switched to is to be shown before switching back. And finally, the P field is set to 1.0.

3.2.3 Tuple Generation

Figure 9A:
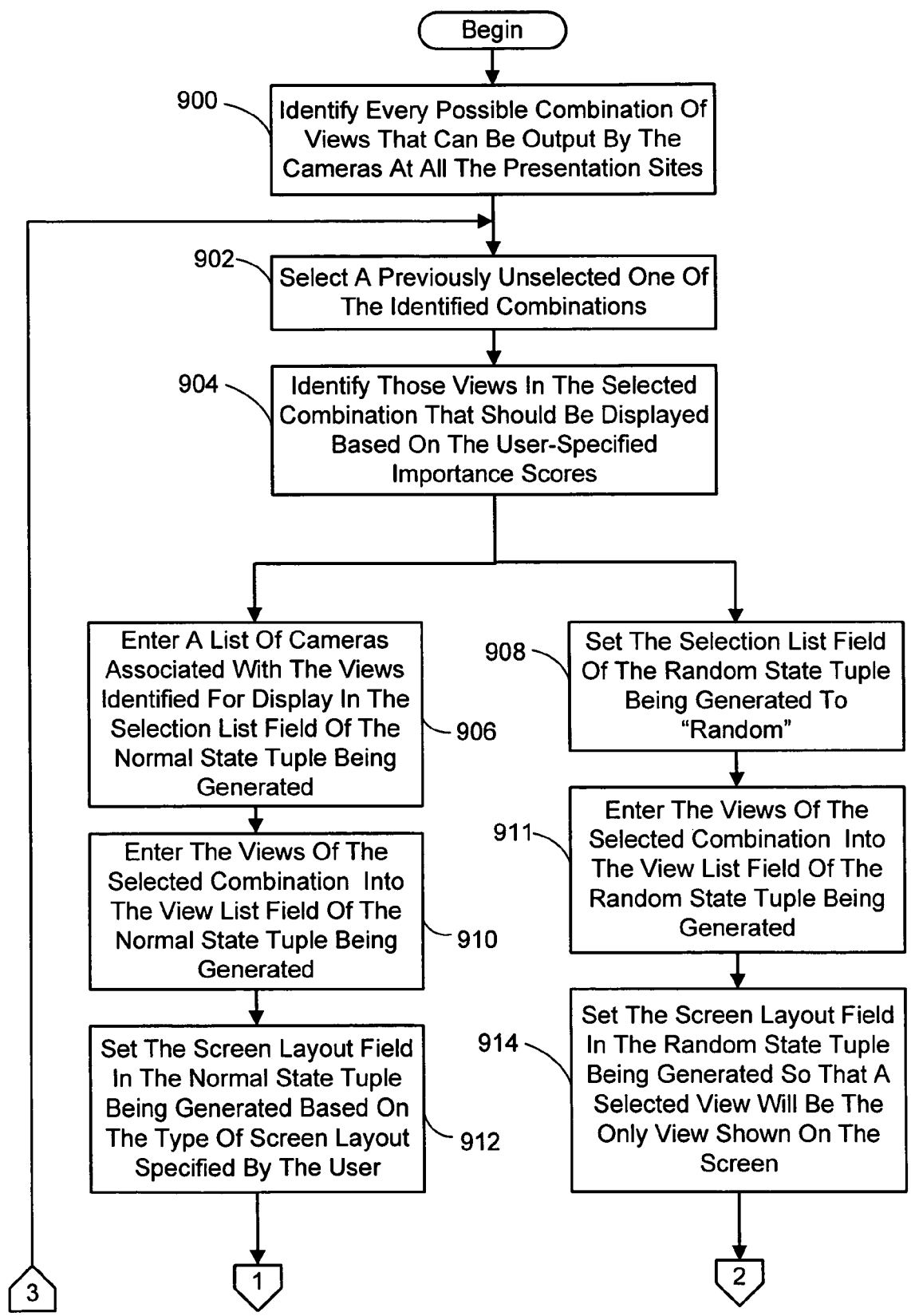
FIGS. 9A-B are a continuing flow chart diagramming a process for generating normal and random state tuples according to one embodiment of the present invention.
Figure 9B:
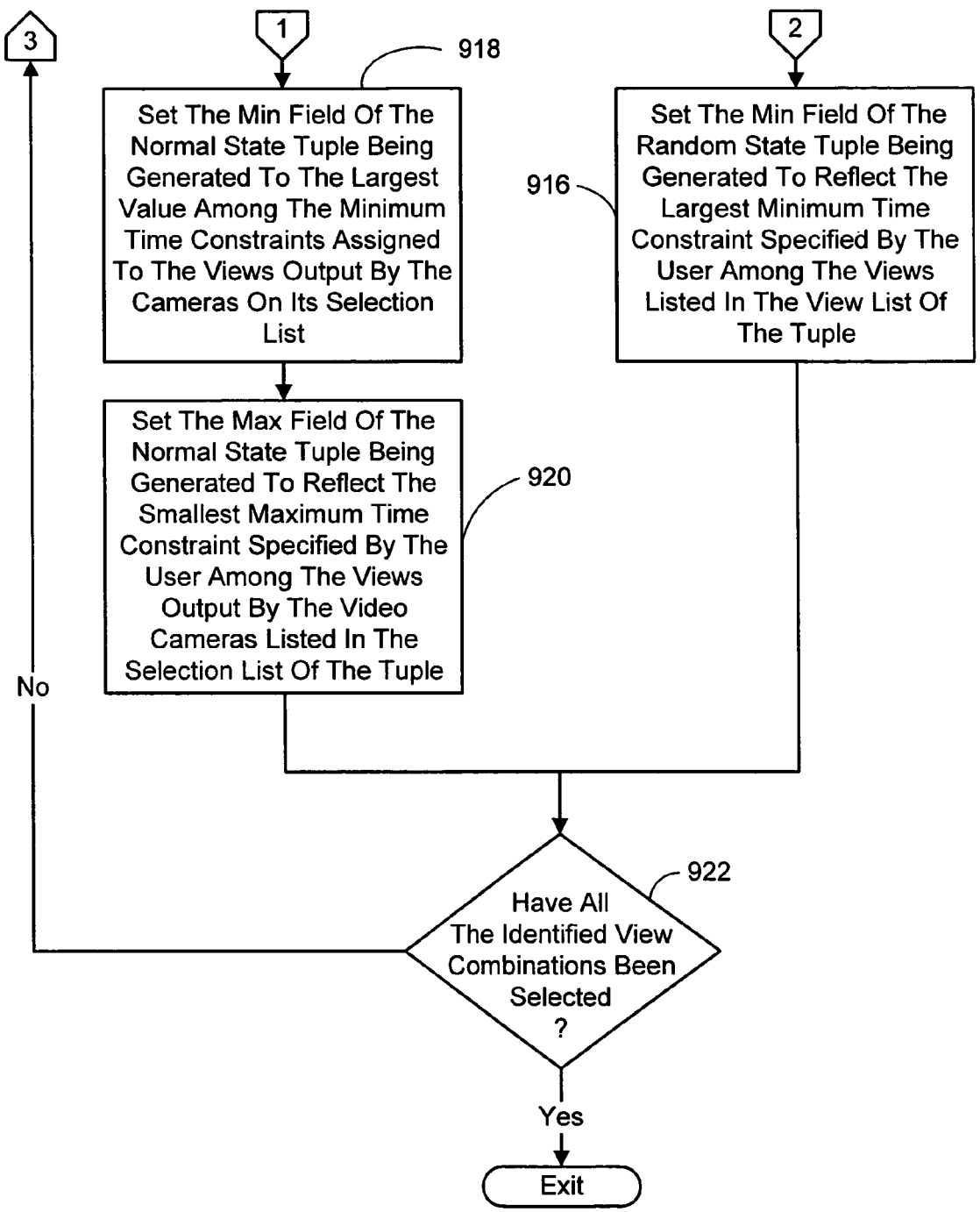

Given the foregoing, the following provides a description of one embodiment of the tuple generation process that is performed after the user inputs the display priorities into the design layer user interface and before the display screen at a site is controlled. Referring to FIGS. 9A-B, the tuple generation process starts by identifying every possible combination of views that can be output by the cameras at all the presentation sites (process action 900). This is accomplished using the aforementioned camera view identification data provided by all the aforementioned cameramen modules to their local display director module and forwarded by that director module to all the display director modules via the network. A previously unselected one of the identified combinations is then selected (process action 902). For each possible view combination, two state tuples are generated—namely a normal state tuple and a random state tuple. To this end, those views in the selected combination being processed that should be displayed based on the user-specified importance scores as described previously, are identified (process action 904). A list of cameras (or cameramen) associated with the views identified for display is entered in the aforementioned selection list field of the normal state tuple (process action 906). The random state tuple of the pair being generated for the selected combination has its selection list field set to "random" process action 908). Each of these tuples has the views of the selected combination entered into their aforementioned view list fields (process action 910 and 911). The aforementioned screen layout field, which is used to specify where on the display screen each of the views output by the cameras listed in the selection list are shown, is set in the normal state tuple of the pair based on the type of screen layout specified by the user (process action 912), whereas the screen layout field in the random state tuple is set so that a selected view will be the only view shown on the screen (process action 914). The aforementioned Min field of the random state tuple of the pair is set to reflect the largest minimum time constraint specified by the user among the views listed in the view list of the tuple (process action 916), and the Min field of the normal state tuple is set to the largest value among the minimum time constraints assigned to the views output by the cameras on its selection list (process action 918). Finally, the aforementioned Max field of the normal state tuple of the pair is set to reflect the smallest maximum time constraint specified by the user among the views output by the video cameras listed in the selection list of that tuple (process action 920), whereas the Max field of the random state tuple is left blank as it is not used. It is next determined if all the identified view combinations have been selected (process action 922). If not, process actions 902 through 922 are repeated, until all the identified combinations have been processed.

Figure 10A:
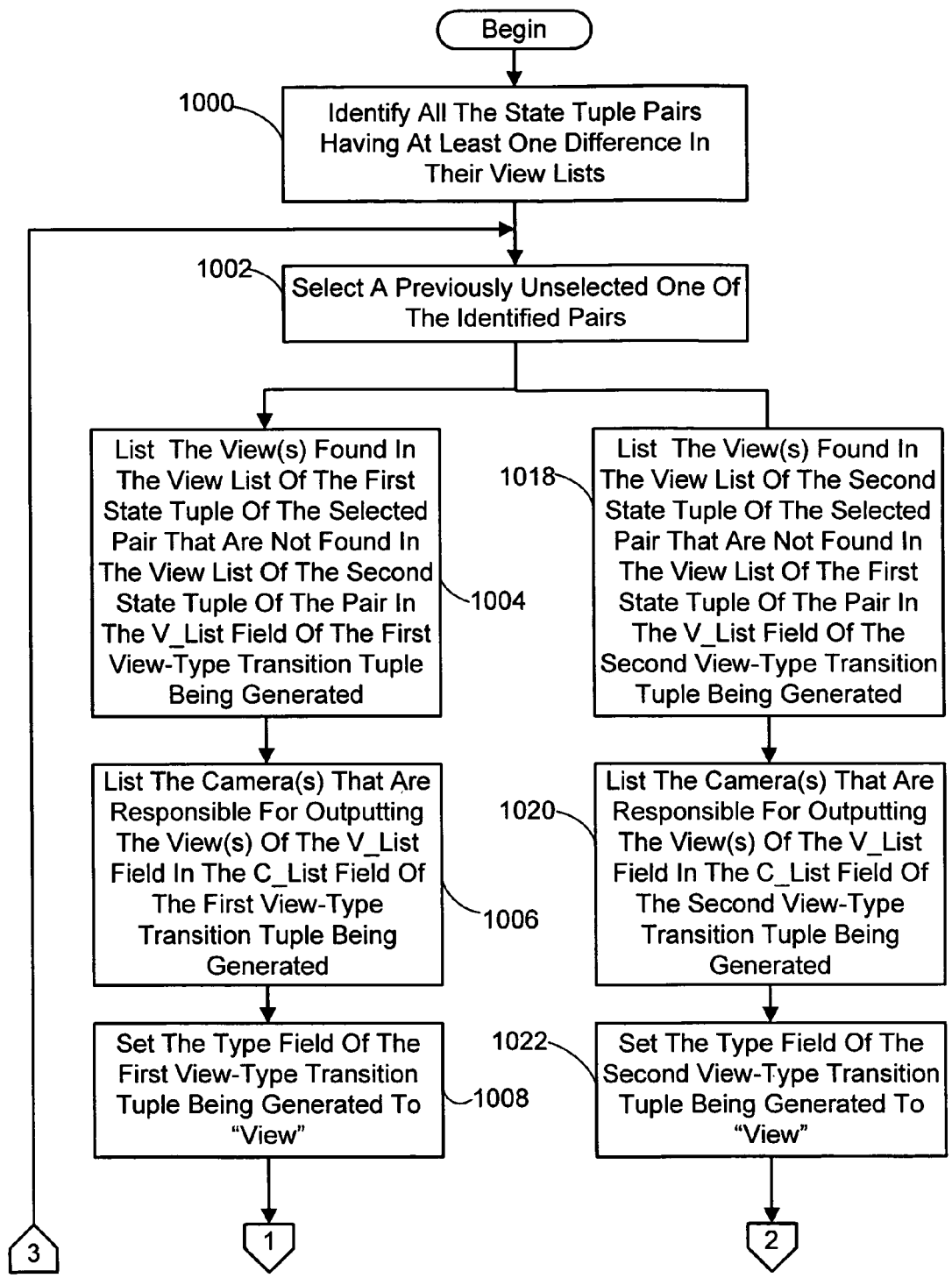
FIGS. 10A-B are a continuing flow chart diagramming a process for generating view-type transition tuples according to one embodiment of the present invention.
Figure 10B:
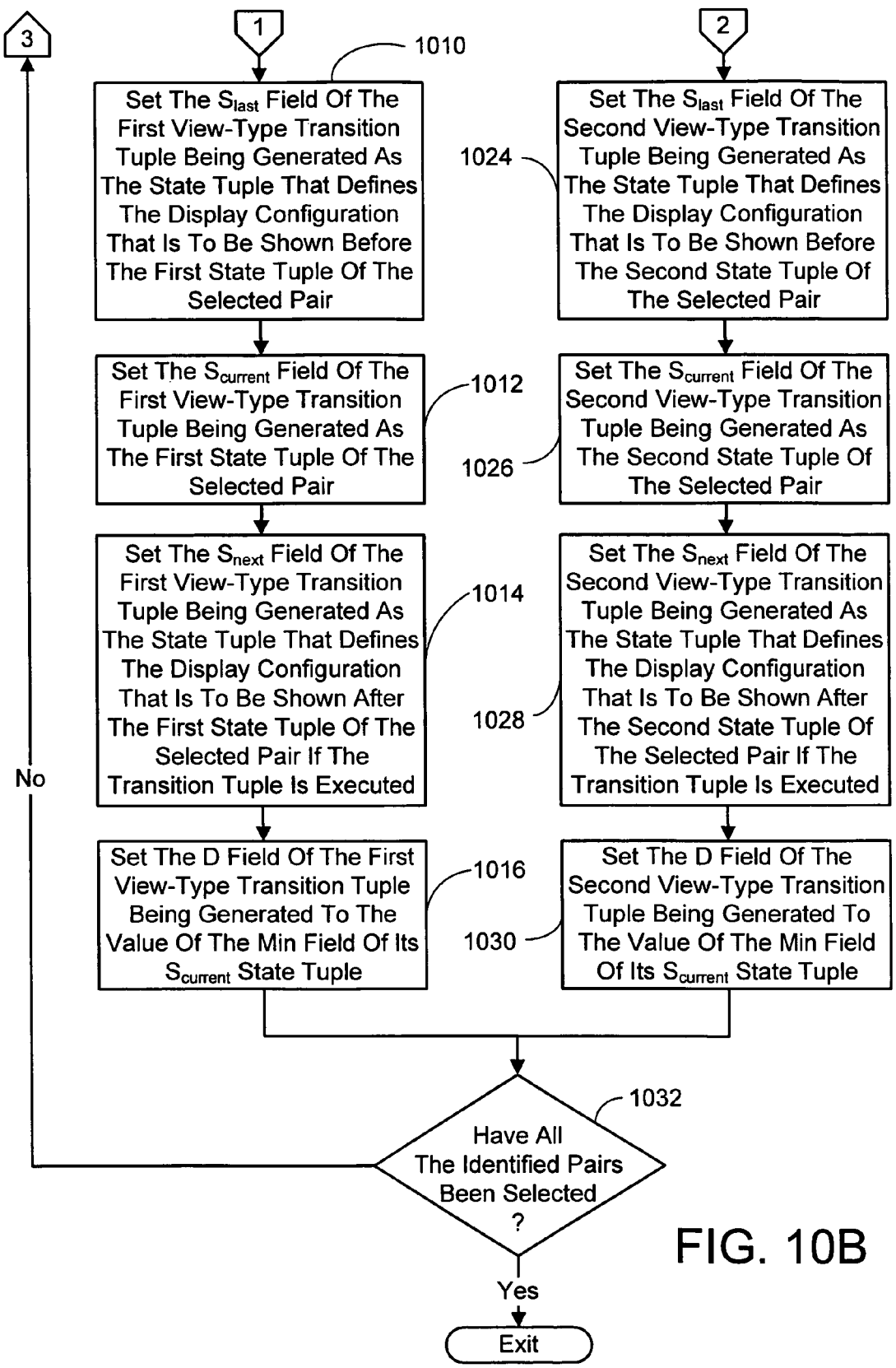

Once all the state tuples have been generated, two view type transition tuples are generated for each possible pairing of the state tuples that have at least one difference in their view lists (including random tuples). To this end, referring now to FIGS. 10A-B, all the possible state tuple pairs having at least one difference in their view lists are identified (process action 1000), and a previously unselected one of them is selected (process action 1002). The aforementioned V_List field of the first of these two transition tuples is created by listing the view or views found in the view list of the first state tuple of the selected pair that are not found in the view list of the second state tuple of the pair (process action 1004). The aforementioned C_List field of the first view-type transition tuple in created by listing the camera or cameras (or cameraman or cameramen) that are responsible for outputting the view or views in the V_List field (process action 1006). In addition, the Type field of the first transition tuple of the pair being generated is set to "View" process action 1008), the state tuple that defines the display configuration that is to be shown before the first state tuple of the selected pair is listed in the aforementioned $S_{last}$ field of this first transition tuple (process action 1010), the first state tuple of the selected pair is listed in the aforementioned $S_{current}$ field of the first transition tuple (process action 1012), the state tuple that defines the display configuration that is to be shown after the first state tuple of the selected pair if the transition tuple being generated is executed is listed in the aforementioned $S_{next}$ field of this first transition tuple (process action 1014), and the aforementioned D field of this first transition tuple is set to the value of the Min field of the $S_{current}$ state tuple (process action 1016). It is noted that the aforementioned P field of this first tuple being generated is left blank as it is not used in a view-type transition tuple.

The second of the two view-type transition tuples for the selected pair of state tuples is generally generated the same way as the first, except using the second of the pair of state tuples as a basis. More particularly, the V_List field of the second transition tuple is created by listing the views found in the view list of the second state tuple of the selected pair that are not found in the view list of the first state tuple (process action 1018). The C_List field of the second transition tuple is again created by listing the camera or cameras (or cameraman or cameramen) that are responsible for outputting the view or views in the V_List field (process action 1020). Additionally, similar to the first transition tuple, the Type field of the second transition tuple is set to "view" process action 1022), the state tuple that defines the display configuration that is to be shown before the second state tuple of the selected pair is identified in the $S_{last}$ field (process action 1024), the second state tuple of the selected pair is identified in the $S_{current}$ field (process action 1026), the state tuple that defines the display configuration that is to be shown after the second state tuple of the selected pair if the second transition tuple being generated is executed is identified in the $S_{next}$ field of this second transition tuple (process action 1028), and the D field of this second transition tuple is set to the value of the Min field of its $S_{current}$ state tuple (process action 1030). Here again, the P field of this second transition tuple is left blank. It is next determined if all the identified state tuple pairs have been selected (process action 1032). If not, process actions 1002 through 1032 are repeated, until all the identified pairs have been processed.

In one embodiment of the execution layer of the display director module, the $S_{last}$ field of the view-type transition tuples is set to "any state tuple" because when view changes occur, the conditions that lead to the current screen configuration are no longer relevant. It is further noted that the $S_{next}$ field of the view-type transition tuples is set to identify the state tuple that includes the new view or views in its view list.

Figure 11A:
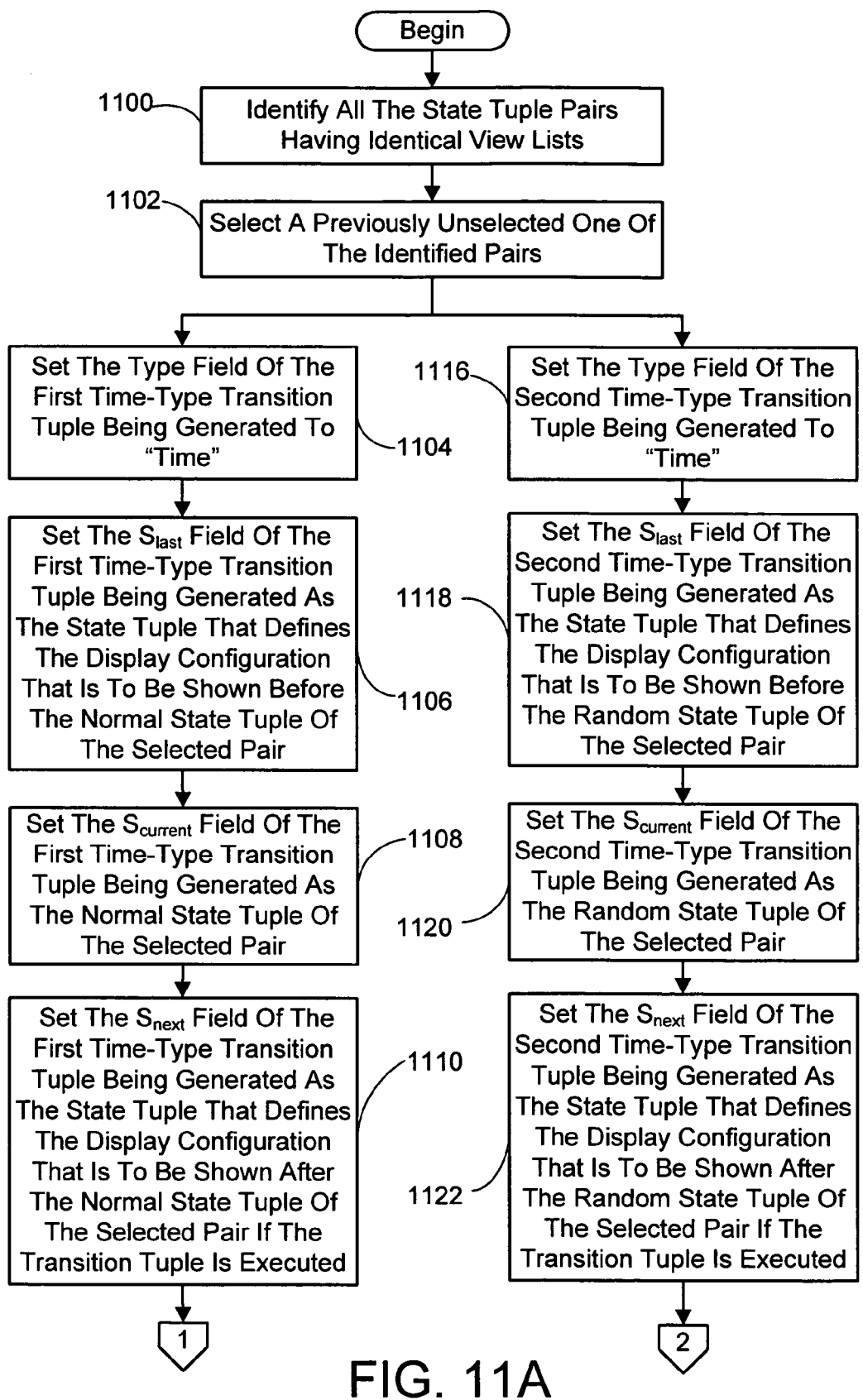
FIGS. 11A-B are a continuing flow chart diagramming a process for generating time-type transition tuples for pairs of normal-random state tuples according to one embodiment of the present invention.
Figure 11B:
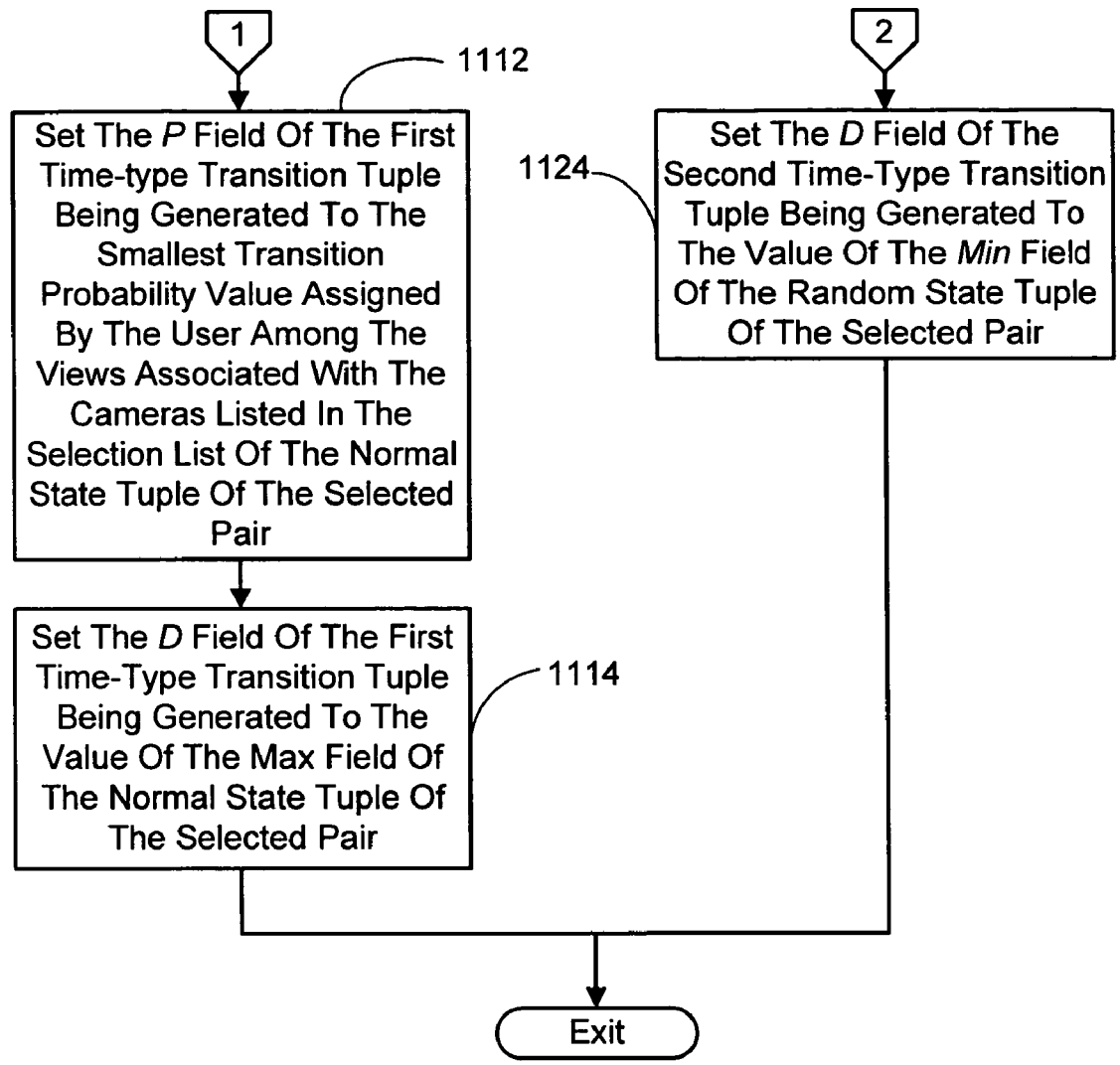

Two time-type transition tuples are also generated for each possible pairing of the state tuples that have identical view lists. Thus, this will involve the related normal-random state tuple pairs. More particularly, referring now to FIGS. 11A-B, all the possible state tuple pairs having identical view lists are identified (process action 1100), and a previously unselected one of them is selected (process action 1102). The first time-type transition tuple is based on the normal state tuple of the selected pair. In this case, the V_List and C_List fields are left blank as they are not used. The Type field of this first transition tuple is set to "Time" process action 1104), the state tuple that defines the display configuration that is to be shown before the normal state tuple of the selected pair is identified in the $S_{last}$ field (process action 1106), the normal state tuple of the selected pair is identified in the $S_{current}$ field (process action 1108), and the state tuple that defines the display configuration that is to be shown after the normal state tuple of the selected pair if the this transition tuple being generated is executed is identified in the $S_{next}$ field of the transition tuple (process action 1110). It is noted that in tested embodiments, the random state tuple of the pair under consideration was identified in both the $S_{last}$ and $S_{next}$ fields. As for the P and D fields of this first time-type transition tuple, the P field is set to the smallest transition probability value assigned by the user among the views associated with the cameras (or cameramen modules) listed in the selection list of the normal state tuple of the selected pair (process action 1112), and the D field is set to the Max field value of the normal state tuple of the selected pair (process action 1114).

The second time-type transition tuple is based on the random state tuple of a pair under consideration. Here again, the V_List and C_List fields are left blank. Similar to the first time-type transition tuple, the Type field of this second transition tuple is set to "Time" process action 1116), the state tuple that defines the display configuration that is to be shown before the random state tuple of the selected pair is identified in the $S_{last}$ field (process action 1118), the random state tuple of the selected pair is identified in the $S_{current}$ field (process action 1120), and the state tuple that defines the display configuration that is to be shown after the random state tuple of the selected pair if the this transition tuple being generated is executed is identified in the $S_{next}$ field of this transition tuple (process action 1122). It is noted that in tested embodiments, the normal state tuple of the pair under consideration was identified in both the $S_{last}$ and $S_{next}$ fields. For the second view-type transition tuple, the P field is left blank as it is not used, but the D field is set to the Min field value of the random state tuple of the selected pair (process action 1124).

Figure 12:
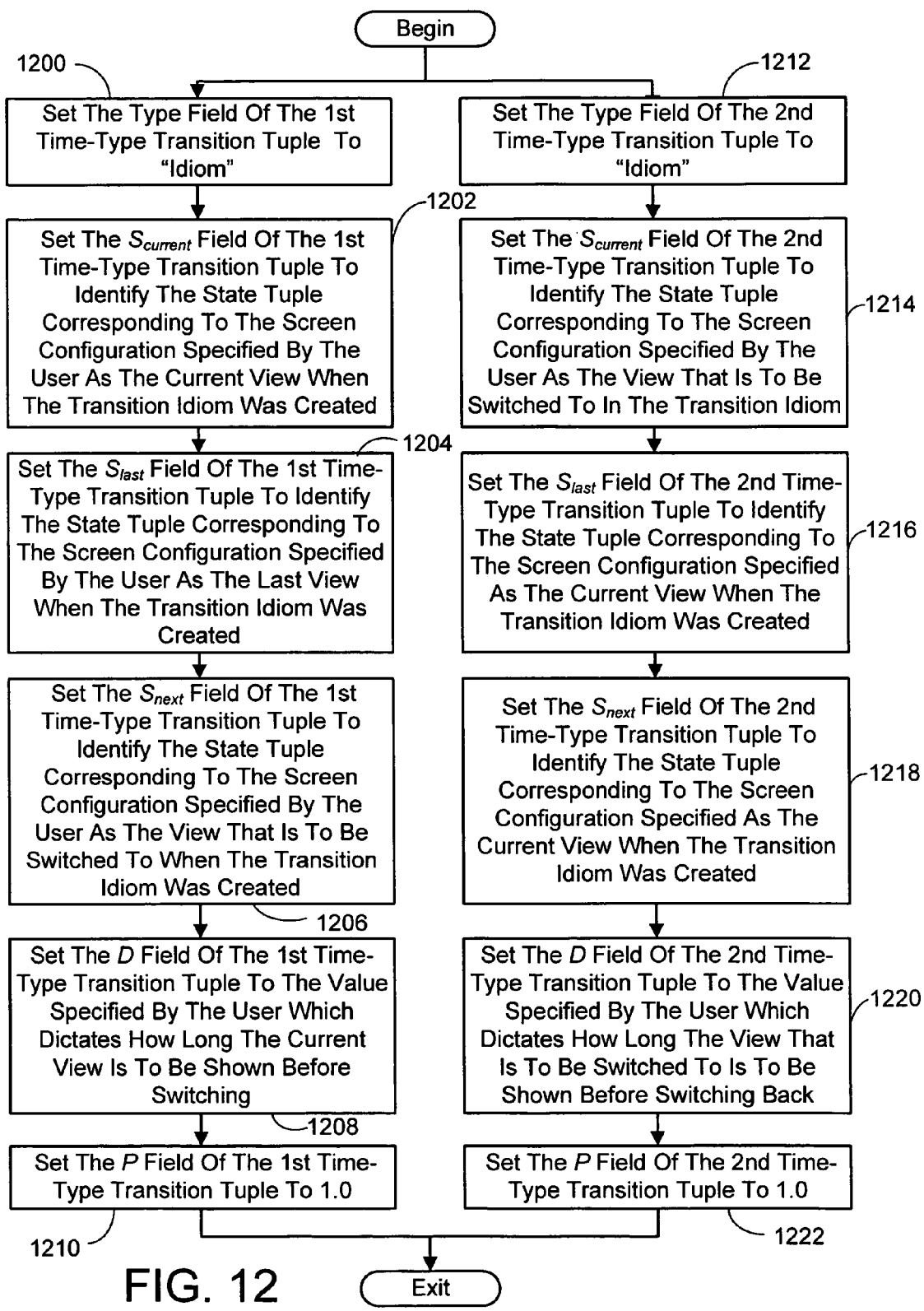
FIG. 12 is a flow chart diagramming a process for generating time-type transition tuples for transition idioms according to one embodiment of the present invention.

In addition to the foregoing transition tuples, a pair of time-type transition tuples are also generated for each transition idiom specified by the user, as described previously. The first of the time-type transition tuple pair is generated to transition from a specified view to another specified view. Referring to FIG. 12, this is accomplished in one embodiment by first setting the Type field to IDIOM (process action 1200). The $S_{current}$ field is then set so as to identify the state tuple corresponding to the screen configuration specified by the user as the current view when the transition idiom under consideration was created (process action 1202). Likewise, the $S_{last}$ field is set so as to identify the state tuple corresponding to the screen configuration specified as the last view (process action 1204), and the $S_{next}$ field is set so as to identify the state tuple corresponding to the screen configuration specified as the view that is to be switched to (process action 1206). The C_List and V_List are not used in an idiom-based time-type transition tuple and so are left blank. However, the D field is set to the value specified by the user which dictates how long the aforementioned current view is to be shown before switching (process action 1208). In the embodiment of the user interface for entering transition idioms described previously, there was no provision for specifying a transition probability. The present flow diagram reflects that embodiment, and so the P field is set to 1.0 (process action 1210). However, in an alternate embodiment, the user would be able to specify a transition probability as well. In this latter case, the P field would be set to the specified value.

The second time-type transition tuple of the pair generated for a transition idiom, transitions back to the original view. In this case, the Type field is also set to IDIOM (process action 1212). However, this time, the $S_{current}$ field is set so as to identify the state tuple corresponding to the screen configuration specified by the user as the view that is to be switched to in the transition idiom (process action 1214). The $S_{last}$ field and the $S_{next}$ field are both set so as to identify the state tuple corresponding to the screen configuration specified as the current view when the transition idiom was created (process actions 1216 and 1218). In this way the screen configuration reverts to the one shown prior to implementing the first transition tuple of the pair. Here again, the C_List and V_List are not used and so are left blank, but the D field is set to the value specified by the user which dictates how long the aforementioned view that is to be switched to is to be shown before switching back (process action 1220). And finally, the P field is set to 1.0 (process action 1222).

3.2.4 Display Screen Control

Figure 13:
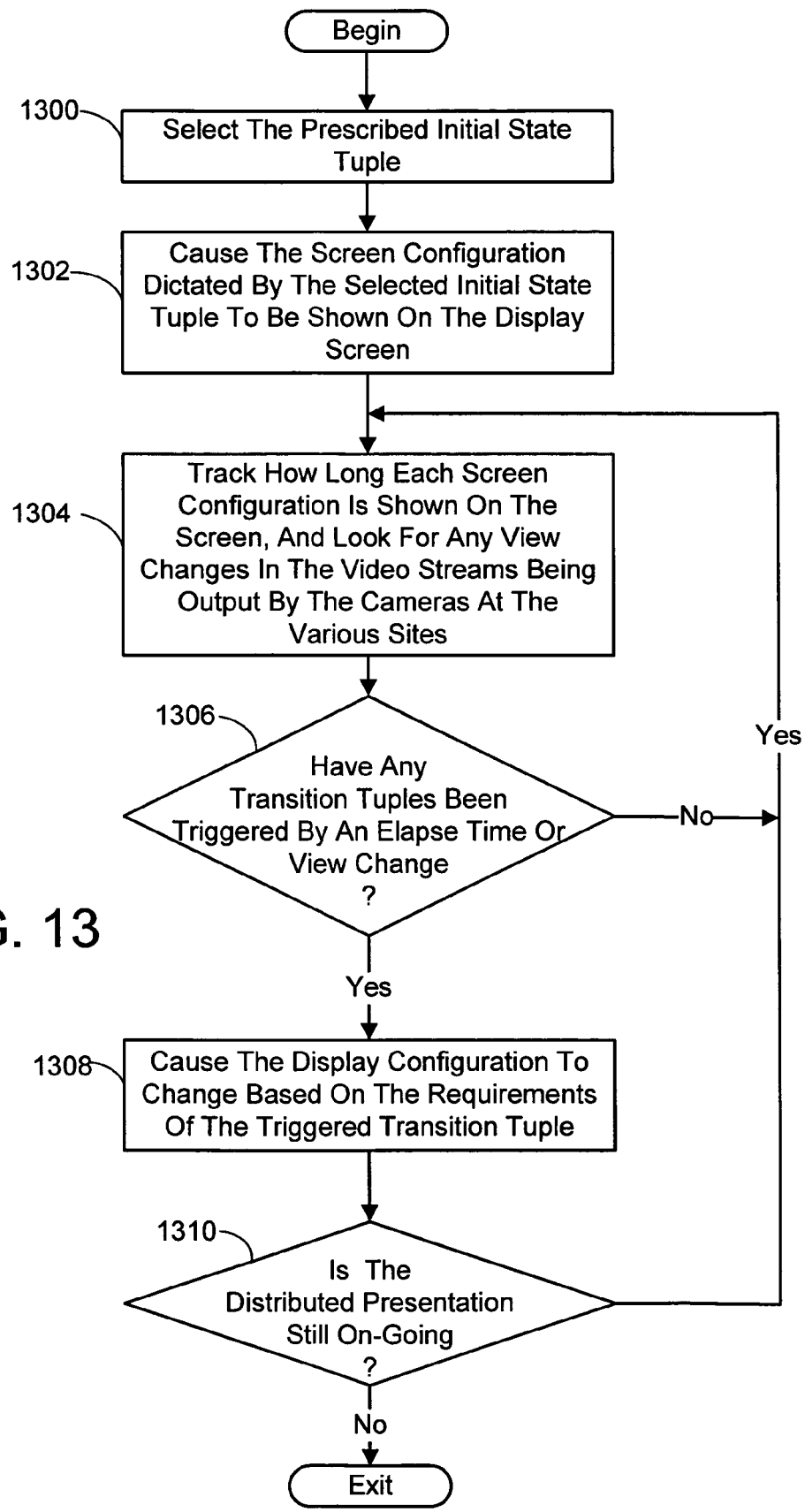
FIG. 13 is a flow chart diagramming a process for controlling a display screen using state and transition tuples according to one embodiment of the execution layer of the two-layer display director module.

Once all the state and transition tuples have been generated, the display director module is ready to control the presentation on the display screen at its local site. Referring to FIG. 13, in one embodiment of the execution layer of the display director module, this involves first selecting a prescribed initial state tuple (process action 1300). Typically, this should be determined by the initial view types of all the camera modules, and could be configured at the setup time of the application by the system administrator. The display director module causes the screen configuration (i.e., which video streams are shown in which sectors) dictated by the selected initial state tuple to be shown on the display screen employing convention methods (process action 1302). In addition, the director module begins to track how long each screen configuration is shown on the screen, and looks for any view changes in the video streams being output by the cameras at the various sites (process action 1304). These time and view change events are what precipitate changes to what is displayed on the screen. To this end, the display director module periodically checks to see if any of the transition tuples are triggered by an elapse time or view change that has occurred (process action 1306). If not, the display director continues to monitor. However, if a time or view change event has occurred, the display director module causes the display configuration to change based on the requirements of the triggered transition tuple (process action 1308). The monitoring and periodic checks then continue for the duration of the distributed presentation. To this end, it is determined if the distributed presentation is still on-going (process action 1310). If so, process actions 1304 through 1310 are repeated. Otherwise the process ends.

Figure 14A:
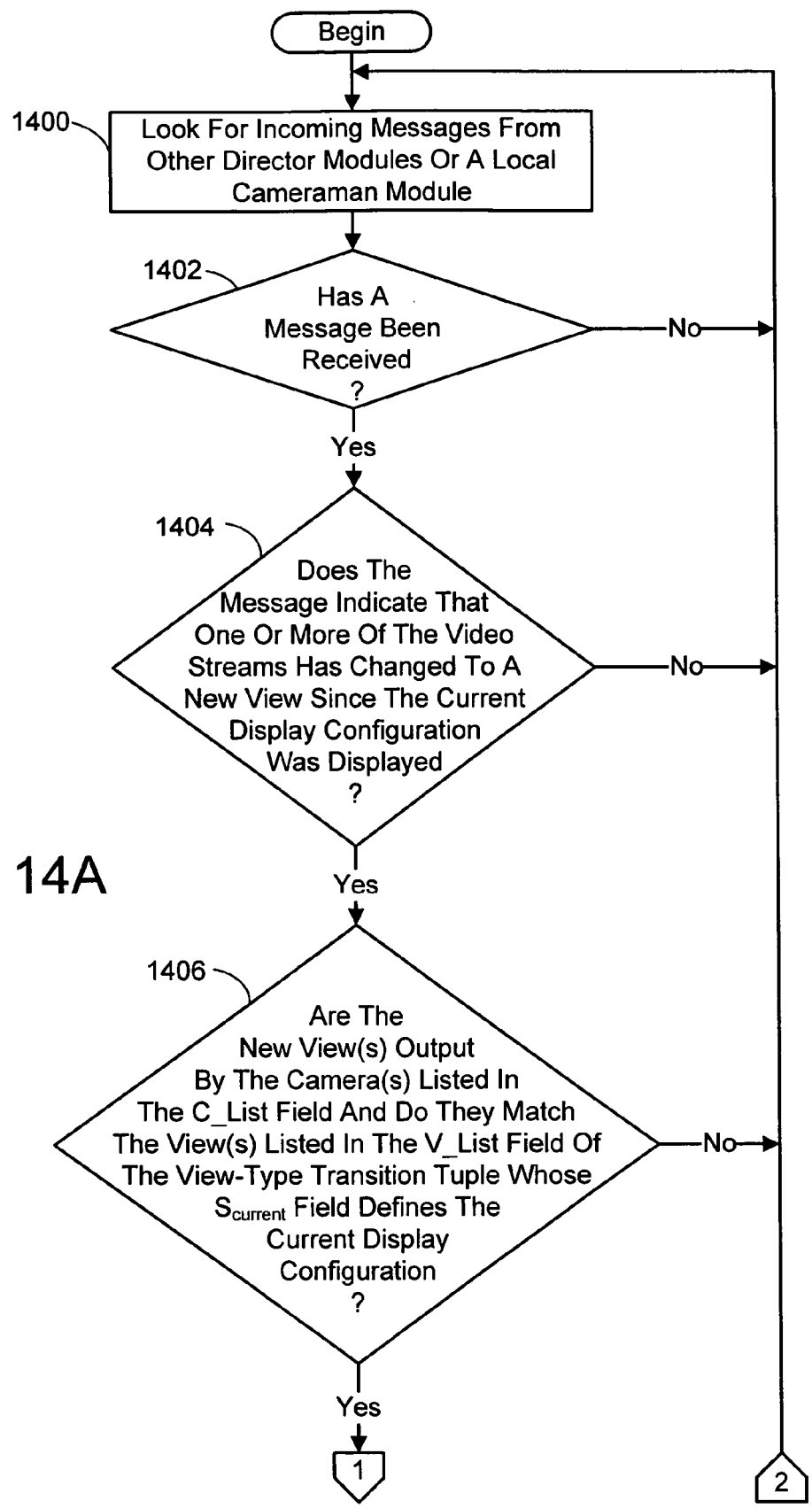
FIGS. 14A-B are a continuing flow chart diagramming a process for changing the screen configuration using view-type transition tuples when camera view changes occur.
Figure 14B:
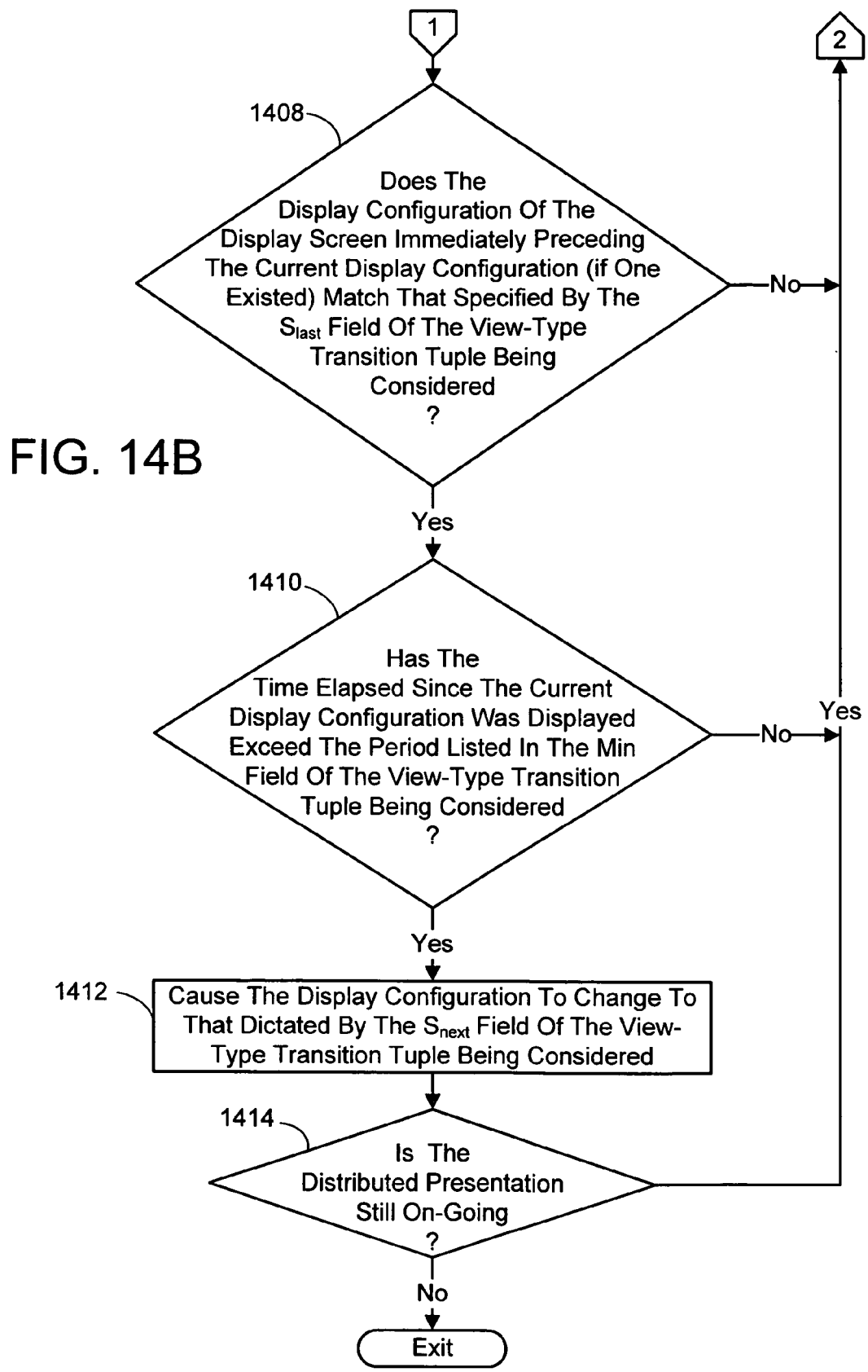

More particularly, referring now to FIGS. 14A-B, the display director module looks for incoming messages from other director modules or a local cameraman module (process action 1400). Whenever it is found that a message has been received (process action 1402), it is determined if the message indicates that one or more of the video streams has changed to a new view since the current display configuration was displayed (process action 1404). If not, no action is taken and the message monitoring continues. However, if the message indicates a view change, the view-type transition tuple whose aforementioned $S_{current}$ field defines the current display configuration, is checked to see if the new view or views are output by the camera or cameras listed in the aforementioned C_List field and match the view or views listed in the V_List field of the transition tuple under consideration (process action 1406). If not, no action is taken and the message monitoring continues. However, if a match is found, the director module checks to see if the display configuration of the display screen immediately preceding the current display configuration (if one existed) matches that dictated by the aforementioned $S_{last}$ field of the view-type transition tuple being considered (process action 1408). In addition, the display director module checks to see if the time that has elapsed since the current display configuration was displayed on the screen exceeds the amount of time listed in the Min field of the view-type transition tuple being considered (process action 1410). If either of these conditions does not exist, no action is taken and the message monitoring continues. However, when both of these conditions exist (including the case where the $S_{last}$ field is blank because the current display configuration is the first displayed in the presentation), the display director module causes the display configuration shown on the screen to change to that dictated by the aforementioned $S_{next}$ field of the view-type transition tuple (process action 1412). The view change monitoring then continues for the duration of the distributed presentation. To this end, it is next determined if the distributed presentation is still on-going (process action 1414). If so, process actions 1400 through 1414 are repeated. Otherwise the process ends.

It is noted that this part of the procedure results in the display configuration not being changed even if a view changes unless the current configuration has been shown for a minimum time. Given this, if the view change affects one of the cameras providing a video stream that is currently being shown on the screen, the sector showing that stream would show the new view instead, but the overall display configuration would not change until the display director rechecks the transition tuple and finds that the view has changed and the period of time listed in the Min field has expired.

Figure 15A:
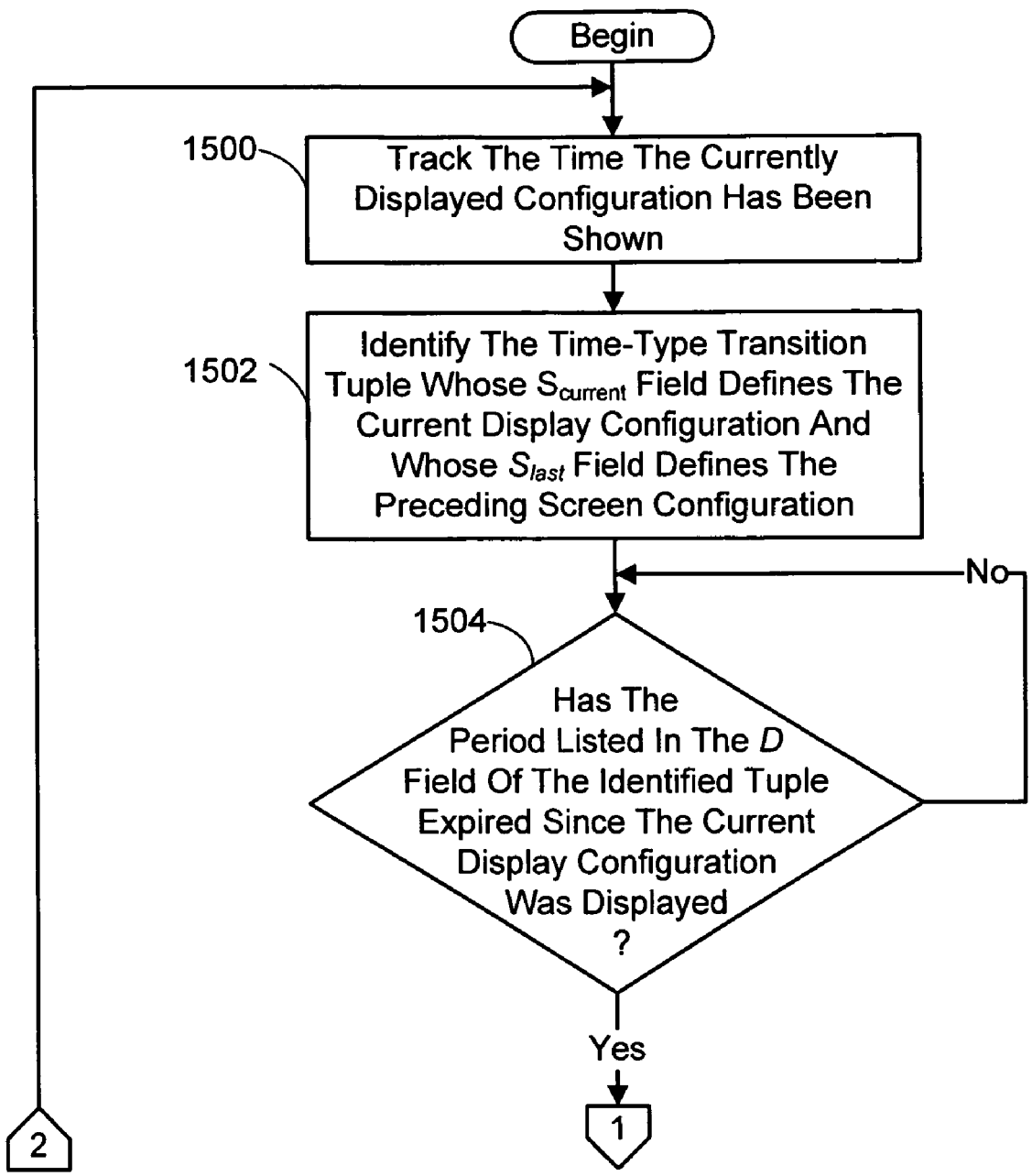
FIGS. 15A-B are a continuing flow chart diagramming a process for changing the screen configuration using time-type transition tuples over time.
Figure 15B:
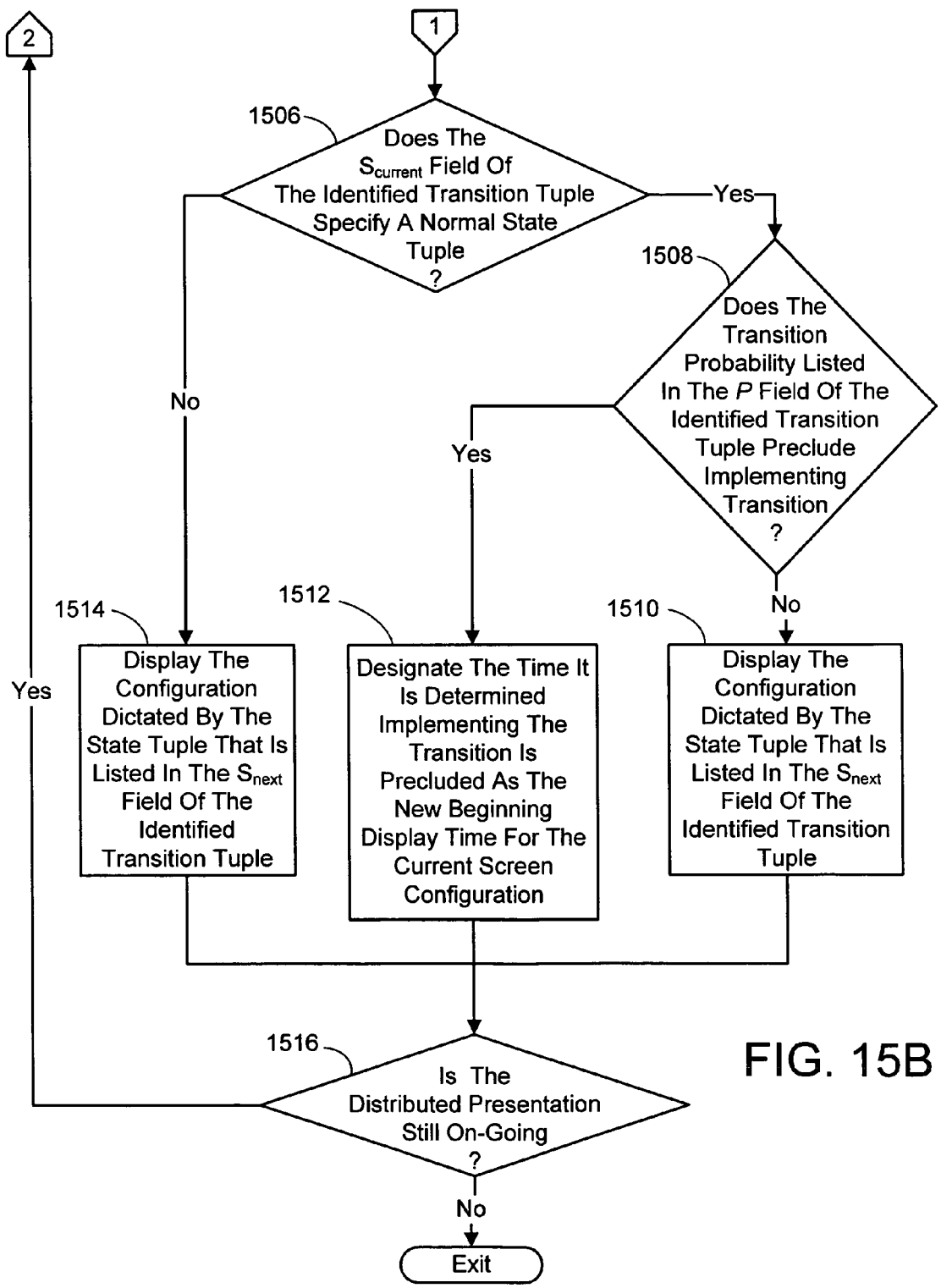

Further, referring now to FIGS. 15A-B, the display director module tracks the time the currently displayed configuration has been shown (process action 1500). It also identifies and periodically checks the time-type transition tuple whose aforementioned $S_{current}$ field defines the current screen configuration and whose $S_{last}$ field defines the preceding screen configuration (process action 1502). More particularly, it is determined if the period of time identified in the aforementioned D field of the tuple has expired since the current display configuration was displayed (process action 1504). If not, the periodic checks continue. However, if it is found the time has expired, it is next determined if the $S_{current}$ field specifies a normal state tuple (process action 1506). If so, the transition probability found in the aforementioned P field of the time-type tuple under consideration is tested to determine if implementing the transition is precluded (process action 1508). In one embodiment of the director module, testing the transition probability entails using a random number generator to generate a number in a range greater than 0 but less than or equal to 1. If the generated number is greater than the listed transition probability, then implementing the transition tuple is precluded. Whenever the time period specified in the D field of the tuple under consideration has expired since the current screen configuration was displayed and implementing the transition is not precluded, the display director module causes the display configuration dictated by the random state tuple (or possibly a normal state tuple if the time-type transition tuple under consideration is idiom based) that is listed in the aforementioned $S_{next}$ field to be shown on the display screen (process action 1510). In the case of a random state tuple, this results in one of the views listed in the aforementioned view list field of the random state tuple to be randomly chosen and displayed on the whole display screen. Whenever the time period specified in the D field of the time-type transition tuple under consideration has expired since the current display configuration was displayed but implementing the transition is precluded, the display director module "resets the clock" by designating the time this determination is made to be the new beginning display time for the current screen configuration (process action 1512). In this way, the time-type transition tuple involved would not be considered for implementation again until the current display configuration has been further displayed for an addition amount of time equal to that listed in the D field of the tuple (unless a view change precipitates a change before that time).

If it is found in process action 1506 that the time has expired, but that the $S_{current}$ field does not specify a normal state tuple (i.e., it is a random state tuple), the display director module causes the display configuration dictated by the state tuple that is listed in the aforementioned $S_{next}$ field to be shown on the display screen (process action 1514). This results in the display configuration shown just before that specified by the random transition tuple under consideration to be displayed on the screen once again (i.e., $S_{next}=S_{last}$).

Whether the display is changed, or the clock is reset, the next action is the same—namely, it is determined if the distributed presentation is still on-going (process action 1516). If the presentation is continuing, process actions 1500 through 1516 are repeated, as appropriate. Otherwise the process ends.

4.0 Alternate Embodiments

While the example architecture of FIG. 2 show a display director located at each site, it is also possible to locate the display directors at a single site, or even a site not associated with a speaker or audience. In this alternate architecture, a display director module assigned to a site where it is not running on a computing device physically located at that site, would control the display screen via the computer network. Still further, the display director functions could be consolidated into a single module that is capable of controlling the displays at multiple sites.

In addition, while it was described previously, that when a random state tuple is employed to define the screen configuration, it results in a single view being displayed on the screen. However, in an alternate embodiment, a random state tuple could instead specify that any prescribed number of views be displayed, up to one less than the number of views listed in its view list. If this is the case, the open Min field of the random state tuple would be set at the time it is employed with the largest minimum time constraint specified by the user among the randomly chosen view or views listed in the View_List field of the random state tuple, which are equal in number to the prescribed number of views.

Although the subject matter has been described in language specific to structural features and/or methodological acts, it is understood that the subject matter defined in the appended claims is not necessarily limited to the specific features or acts described above. Rather, the specific features and acts described above are disclosed as example forms of implementing the claims.

Wherefore, what is claimed is:

1. A computer network-based distributed presentation system for displaying one or more video streams output by multiple video cameras located at multiple presentation sites, comprising:
   a first video camera located at one of the presentation sites, the first video camera capable of outputting a first video stream to a computing network, the first video stream comprising a first view of the one presentation site where the first camera is located;
   a second camera located at another one of the presentation sites, the second video camera capable of outputting a second video stream to the computing network, the second video stream comprising a second view of the another one presentation site where the second camera is located;
   a first general purpose computing device located at a first presentation site of the presentation sites;
   a first display screen located at the first presentation site, the first display screen being capable of simultaneously displaying the first and second video streams in respective first and second display sectors of the first display screen and which is controlled by said first computing device;
   a second general purpose computing device located at a second presentation site, different from the first presentation site, of the presentation sites;
   a second display screen located at the second presentation site, the second display screen being capable of simultaneously displaying the first and second video streams in respective third and fourth sectors of the second display screen and which is controlled by said second computing device;
   a first display director module executable by the first computing device, wherein the first device is directed by the first display director module to:
      based on first local user preferences, automatically determine on an on-going basis which of the first and second video streams output to the computer network are to be downloaded for display on the first display screen at the first presentation site where the first display director is running and select which of the first and second sectors of the first display screen the downloaded video stream or streams are to be displayed;
      based on the first local user preferences, automatically control the first display screen so as to display the video stream or streams downloaded by the first computing device in the sectors selected by the first display director; and
   a second display director module executable by the second computing device, wherein the second computing device is directed by the second display director to:
      based on second local user preferences, different from the first local user preferences, determine, independent of the first display director module, on the on-going basis which of the first and second video streams output to the computer network are to be downloaded for display on the second display screen at the second presentation site, where the second display director is running and select which of the third and fourth sectors of the second display screen the downloaded video streams or streams are to be displayed;
      based on the second local user preferences, control the second display screen so as to display the video stream or streams downloaded by the second computing device in the sectors selected by the second display director, such that one or both of the video stream or streams downloaded by the second computing device and the sector selected by the second display director are different than one or both of the video stream or stream downloaded by the first computing device and the sectors selected by the first display director.

2. The system of claim 1, wherein the first video camera is located at the first presentation site, wherein first computing device provides a first video stream locating data to the first director module, based on the first video stream locating data, the first display director module finds and downloads the first video stream, and wherein the first display director module is in communication with the second display director module via the computer network and wherein the first display director module further directs the first computing device to provide the first video stream locating data and other received video stream locating data to the second display director module so that the second display director module can find and download for display on the second display screen, videos streams identified by the first and other video stream locating data and output by any of the video cameras at any of the presentation sites.

3. The system of claim 2, wherein each display director module maintains a record of the current view being output by each camera across all the sites and whenever a video camera reports to the display director module at the same presentation site via the computing device controlling the video camera that it has changed the view it is capturing, the display director updates said record of current views and forward the view change information to the display director modules associated with other sites via the computer network for use in updating the record of view information maintained by each of those other display director modules.

4. A computer-implemented two-layer display director process for controlling the display of multiple video streams output to a computer network from video cameras located at multiple distributed sites on a display screen which is capable of simultaneously displaying one or more video streams, each video stream displayed in a different display sector of the screen, the process comprising:
  using a computer with a memory and processor executing instructions stored on the memory to perform the following process actions,
  in the first layer, providing a user interface for a user to specify display priorities dictating what video streams are to be displayed on the screen over time, and providing the display priorities to the second layer of the display director process; and
  in the second layer, translating the user-specified display priorities into probabilistic times automata; and
  in the second layer, automatically using the automata to control what is displayed on the display screen over time and where on the screen it is displayed based on at least one member of the group comprising: a time a video stream is displayed and view state changes in the video stream.

5. The process of claim 4, wherein the process action of providing a user interface for the user to specify display priorities, comprises an action of providing as part of the user interface a provision for the user to enter camera view importance specifications which allows the user to specify for each view that can be output by any video camera across all the sites a level of importance indicative of the priority that view is to be given by the display director in deciding which views are to be displayed on the screen.

6. The process of claim 4, wherein the process action of providing a user interface for the user to specify display priorities, comprises an action of providing as part of the user interface a provision for the user to enter camera view importance specifications which allows the user to specify for each view that can be output by any video camera across all the sites any one of three progressive levels of importance indicative of the priority that view is to be given by the display director in deciding which views are to be displayed on the screen, wherein the highest of these levels indicates that a view is to be displayed most of the time.

7. The process of claim 4, wherein the process action of providing a user interface for the user to specify display priorities, comprises an action of providing as part of the user interface a provision for the user to enter timing constraints which allows the user to specify for each view that can be output by any video camera across all the sites a minimum time which the view is to be displayed on the screen and a maximum time the view should be displayed on the screen barring other display priorities.

8. The process of claim 7, wherein the process action of providing a user interface for the user to specify display priorities, comprises an action of providing as part of the user interface a provision for the user to enter transition probabilities which allows the user to specify for each view that can be output by any video camera across all the sites, a probability value that dictates the percentage of time that a view which has been displayed for its user-specified maximum time will be replaced with a different view.

9. The process of claim 4, wherein the process action of providing a user interface for the user to specify display priorities, comprises an action of providing as part of the user interface a provision for the user to enter a video composition selection which allows the user to specify which of a prescribed number of screen layout formats the display director is to use in displaying views output by the video cameras.

10. The process of claim 4, wherein the process action of providing a user interface for the user to specify display priorities, comprises an action of providing as part of the user interface a provision for the user to enter a transition idiom which allows the user to specify that if a current video camera view has been view X for over m seconds, and the last video camera view was Y, then view X is to be replaced with a view currently being captured by video camera Z for at least n seconds.

11. The process of claim 10, wherein view X can be specified as any video camera's current view, and video camera Z can be specified as any video camera at any of the sites.

12. A computer-implemented two-layer display director process for controlling the display of multiple video streams output to a computer network from video cameras located at multiple distributed sites on a display screen which is capable of simultaneously displaying one or more video streams in display sectors of the screen, comprising:
  using a computer with a memory and processor executing instructions stored on the memory to perform the following process actions,
  in the first layer, providing a user interface for a user to specify display priorities dictating what video streams are to be displayed on the screen over time, and providing the display priorities to the second layer of the display director process; and
  in the second layer, translating the user-specified display priorities into probabilistic times automata and using the automata to control what is displayed on the display screen over time and where on the screen it is displayed, wherein said translating comprises, generating a series of state and transition tuples, wherein each state tuple describes a display configuration comprising what views are displayed, where they are displayed on the display screen and for how long, and what views are currently available from the various cameras at all the sites, and wherein each state tuple S takes the form S=<View_List Selection_List, SL, Max, Mm>, where the View_List field comprises a list of the possible views combinations of the video cameras present across all the sites, the Selection_List field comprises a list of the cameras whose views are found in the View_List field and whose outputs are selected for display on the display screen, the SL field specifies the screen configuration layout to be used in displaying the views output by the selected video cameras, and Max and Mm fields represent the maximum and minimum time specified for displaying the screen configuration defined by the state tuple, and wherein each transition tuple specifies the conditions under which a displayed screen configuration is to be changed to another screen configuration, and wherein each transition tuple T takes the form T=<Type, $S_{last}$, $S_{current}$, C_List, V_List, D, P, $S_{next}$>, where the Type field is either "Time" or "View", $S_{last}$ is the state tuple defining the screen configuration displayed just before the currently displayed screen configuration defined by state tuple identified in $S_{current}$, $S_{next}$ is the state tuple defining the screen configuration that is to be transitioned to after $S_{current}$, D refers to one of various time periods, P refers to the transition probability from current state $S_{current}$ to next state $S_{next}$, the V_List field comprises a list of one or more views listed in the View_List field of a state tuple that remain after those views that are common with another state tuple are eliminated, and the C_List field comprises a list of the camera or cameras that output the view or views found in the V_List.

13. The process of claim 12, wherein the process action of generating the series of state and transition tuples, comprises the actions of:
generating a normal state tuple and a random state tuple for each possible combination of views that can be output at any one time by all the video cameras across all the sites, wherein a normal state tuple defines a screen configuration where all the views currently output by the cameras listed in the Selection_List field are displayed on the display screen, and wherein a random state tuple defines a screen configuration where one or more view listed in the View_List field is displayed on the display screen;
generating a view-type transition tuple for each state tuple in each possible pair of state tuples that exhibit at least one view that is different between their View_List fields, wherein a view-type tuple specifies a transition that occurs if the last screen configuration displayed before the current screen configuration was defined by a state tuple listed in the $S_{last}$ field and the current screen configuration is defined by a state tuple listed in the $S_{last}$ field and the view or views associated with the $S_{current}$ state tuple have been displayed for at least D seconds, then when the video camera or cameras listed in the in the C_List field change the view or views being output to those listed in the V_List field, the screen configuration is changed to that defined by the state tuple listed in the $S_{next}$ field;
generating two time-type transition tuples for each possible pair of normal and random state tuples that have the identical views listed in their View_List fields, one of said time-type transition tuples specifying a transition from the screen configuration defined by the normal state tuple of a pair to that defined by the random state tuple of the pair and the other of said time-type transition tuples specifying a transition from the screen configuration defined by the random state tuple of a pair to that defined by the normal state tuple of the pair, wherein a time-type tuple specifies a transition that occurs if the last screen configuration displayed before the current screen configuration was defined by a state tuple listed in the $S_{last}$ field and the current screen configuration is defined by a state tuple listed in the $S_{current}$ field and the view or views associated with the $S_{current}$ state tuple have been displayed for at least the time period specified in the D field, the screen configuration is changed to that defined by the state tuple listed in the $S_{next}$ field if not precluded by the transition probability listed in the P field.

14. The process of claim 13, wherein the process action of generating a normal state tuple and a random state tuple for each possible combination of views that can be output at any one time by all the video cameras across all the sites, comprises the actions of:
identifying every possible combination of views that can be output by the video cameras at all the sites at any one time; and
for each identified view combination,
identifying those views in the view combination under consideration that should be displayed based on the user-specified display priorities,
listing the video cameras responsible for outputting the identified views that should be displayed in the Selection_List field of the normal state tuple being generated,
setting the Selection_List field of the random state tuple being generated to "random",
listing the views of the view combination under consideration in the View_List field of both the normal and random state tuple being generated,
setting the SL field of the normal state tuple being generated based on a screen layout format specified by the user,
setting the SL field of the random state tuple being generated so that a prescribed number of views from the View_List field will be the only views shown on the screen,
leaving the Min field of the random state tuple being generated open so that whenever the random state tuple being generated is employed the Min field is set to reflect the largest minimum time constraint specified by the user among randomly chosen view or views listed in the View_List field of the random state tuple that are equal in number to said prescribed number of views,
setting the Min field of the normal state tuple being generated to reflect the largest minimum time constraint specified by the user among the views output by the video cameras listed in the Selection_List field of the normal state tuple, and
setting the Max field of the normal state tuple being generated to reflect the smallest maximum time constraint specified by the user among the views output by the video cameras listed in the Selection_List field of the normal state tuple.

15. The process of claim 13, wherein the process action of generating a view-type transition tuple for each state tuple in each possible pair of state tuples that exhibit at least one view that is different between their View_List fields, comprises the actions of:
identifying all the possible state tuple pairs having at least one difference in their View_List fields; and
for each state tuple of each of the identified state tuple pairs,
listing the view or views found in the View_List field of the state tuple under consideration that are not found in the View_List field of the other state tuple of the pair in the V_List field of the view-type transition tuple being generated, listing the camera or cameras that are responsible for outputting the view or views in the V_List field in the C_List field of the view-type transition tuple being generated, setting the Type field of the view-type transition tuple being generated to "View", setting the $S_{last}$ field of the view-type transition tuple being generated to identify the state tuple that defines the screen configuration that is to be shown before the screen configuration defined by the state tuple under consideration, setting the $S_{current}$ field of the view-type transition tuple being generated to identify the state tuple under consideration, setting the $S_{next}$ field of the view-type transition tuple being generated to identify the state tuple that defines the screen configuration that is to be shown after the screen configuration defined by the state tuple under consideration if the transition tuple being generated is executed, and setting the D field of the view-type transition tuple being generated to the value of the Min field of the state tuple under consideration.

16. The process of claim 13, wherein the process action of generating two time-type transition tuples for each possible pair of normal and random state tuples that have the identical views listed in their View_List fields, comprises the actions of:

identifying pairs of normal and random state tuples that have the identical views listed in their View_List fields;

for each normal state tuple of each of the identified pairs of normal and random state tuples, setting the Type field of the first time-type transition tuple being generated to "Time", setting the $S_{last}$ field of the first time-type transition tuple being generated to identify the state tuple that defines the screen configuration that is to be shown before the screen configuration defined by the normal state tuple under consideration, setting the $S_{current}$ field of the first time-type transition tuple being generated to identify the normal state tuple under consideration, setting the $S_{next}$ field of the first time-type transition tuple being generated to identify the random state tuple that defines the screen configuration that is to be shown after the screen configuration defined by the normal state tuple under consideration if the first transition tuple being generated is executed, setting the P field of the first time-type transition tuple being generated to the smallest of the transition probabilities assigned by the user to views output by the video cameras listed in the Selection_List field of the normal state tuple under consideration, and setting the D field of the first time-type transition tuple being generated to the value of the Max field of the normal state tupte under consideration; and for each random state tuple of each of the identified pairs of normal and random state tuples, setting the Type field of the second time-type transition tuple being generated to "time", setting the $S_{last}$ field of the second time-type transition tuple being generated to identify the state tuple that defines the screen configuration that is to be shown before the screen configuration defined by the random state tuple under consideration, setting the $S_{current}$ field of the second time-type transition tuple being generated to identify the random state tuple under consideration, setting the $S_{next}$ field of the second time-type transition tuple being generated to identify the normal state tuple that defines the screen configuration that is to be shown after the screen configuration defined by the random state tuple under consideration if the second transition tuple being generated is executed, and setting the D field of the second time-type transition tuple being generated to the value of the Min field of the random state tuple under consideration.

17. The process of claim 13, wherein the process action of using the automata to control what is displayed on the display screen overtime and where on the screen it is displayed, comprises the actions of:

selecting a prescribed initial state tuple;

causing the screen configuration defined by the selected initial state tuple to be displayed on the display screen;

starting with the first screen configuration displayed, tracking how long each screen configuration is displayed on the screen, and detecting any view changes in the video streams being output by the video cameras across all the sites;

periodically checking each transition tuple to determine if any of the transition tuples are triggered by an elapsed time since a screen configuration has been displayed on the screen or view change in the output of a video camera; and whenever, it is determined that a transition tuple is triggered, causing the screen configuration to change as specified by the triggered transition tuple.

18. The process of claim 17, wherein the process actions of periodically checking each transition tuple to determine if any of the transition tuples are triggered by a view change in the output of a video camera and causing the screen configuration to change as specified by the triggered transition tuple, comprises the actions of:

whenever a view change in one or more of the video streams being output by the video cameras across all the sites is detected, identifying the view-type transition tuple whose $S_{current}$ field defines the current screen configuration;

determining if the video camera or cameras responsible for outputting the new view or views match camera or cameras listed in the C_List field of the identified view-type transition tuple and if the new view or views match view or views listed in the V_List field of the identified view-type transition tuple;

whenever a match is found, determining if the screen configuration of the display screen immediately preceding the current screen configuration, if one existed, matches that defined by the $S_{last}$ field of the identified view-type transition tuple, and determining if the time that has elapsed since the current screen configuration was displayed on the screen exceeds the amount of time listed in the Min field of the identified view-type transition tuple; and whenever it is determined that the screen configuration of the display screen immediately preceding the current screen configuration, if one existed, matches that defined by the $S_{last}$ field of the identified view-type transition tuple and the time that has elapsed since the current screen configuration was displayed on the screen exceeds the amount of time listed in the Min field of the identified view-type transition tuple, causing the screen configuration currently displayed on the screen to change to that defined by the state tuple identified in the $S_{next}$ field of the identified view-type transition tuple.

19. The process of claim 17, wherein the process actions of periodically checking each transition tuple to determine if any of the transition tuples are triggered by an elapsed time since a screen configuration has been displayed on the screen and causing the screen configuration to change as specified by the triggered transition tuple, comprises the actions of:

(a) periodically checking the time-type transition tuple whose $S_{current}$ field identifies a state tuple that defines the currently displayed screen configuration and whose $S_{last}$ field defines the preceding screen configuration to determine if the period of time identified in the D field of the transition tuple under consideration has expired since the current display configuration was displayed or designated to have been displayed;

(b) whenever it is found that said time period identified in the D field of the transition tuple under consideration has expired and the $S_{current}$ field identifies a random state tuple, causing the screen configuration currently displayed on the screen to change to that defined by the state tuple identified in the $S_{next}$ field of the time-type transition tuple under consideration;

(c) whenever it is found that said time period identified in the D field of the transition tuple under consideration has expired and the $S_{current}$ field identifies a normal state tuple, testing the transition probability found in the P field of the time-type transition tuple under consideration to determine if implementing the transition tuple is precluded;

(d) whenever it is determined that implementing the transition tuple under consideration is not precluded, causing the screen configuration currently displayed on the screen to change to that defined by the state tuple identified in the $S_{next}$ field of the time-type transition tuple under consideration; and (e) whenever it is determined that implementing the transition tuple under consideration is precluded, designating the current display configuration to have been displayed at the time this determination is made and repeating process actions (a) through (e) as appropriate.

20. The process of claim 12, wherein the process action of providing a user interface for the user to specify display priorities, comprises an action of providing as part of the user interface a provision for the user to enter one or more transition idioms, and wherein the process action of generating the series of state and transition tuples, comprises an action of generating two time-type transition tuples for each transition idiom entered by the user, one of said time-type transition tuples specifying a transition from a screen configuration defined by a current state tuple to screen configuration defined by another state tuple after a prescribed period, and the other of said time-type transition tuples specifying a transition back to the screen configuration defined by said current state tuple from the screen configuration defined by said other state tuple after a second prescribed time period, wherein each of the time-type tuples specifies a transition that occurs if the last screen configuration displayed before the current screen configuration was defined by a state tuple listed in the $S_{last}$ field and the current screen configuration is defined by the state tuple listed in the $S_{current}$ field and the view or views associated with the $S_{current}$ state tuple have been displayed for at least the time period specified in the D field, the screen configuration is changed to that defined by the state tuple listed in the $S_{next}$ field if not precluded by the transition probability listed in the P field.

21. The process of claim 20, wherein the process action of generating two time-type transition tuples for each transition idiom entered by the user, comprises the actions of:

setting the Type field of the first time-type transition tuple being generated to "Idiom", setting the $S_{last}$ field of the first time-type transition tuple being generated to identify a state tuple that defines the screen configuration specified by the user as the last view when the transition idiom was created, setting the $S_{current}$ field of the first time-type transition tuple being generated to identify a state tuple that defines the screen configuration specified by the user as the current view when the transition idiom was created, setting the $S_{next}$ field of the first time-type transition tuple being generated to identify a state tuple that defines the screen configuration specified by the user as the screen configuration that is to be switched to if the first transition tuple being generated is executed, setting the P field of the first time-type transition tuple being generated to the value specified by the user, if one, and to 1.0 otherwise, and setting the D field of the first time-type transition tuple being generated to the value specified by the user which dictates how long the aforementioned current view is to be shown before switching; and setting the Type field of the second time-type transition tuple being generated to "Idiom", setting the $S_{last}$ field of the second time-type transition tuple being generated to identify the state tuple that defines the screen configuration specified by the user as the current view when the transition idiom was created, setting the $S_{current}$ field of the second time-type transition tuple being generated to identify the state tuple that defines the screen configuration specified by the user as the screen configuration that is to be switched to if the first transition tuple is executed, setting the $S_{next}$ field of the second time-type transition tuple being generated to identify the state tuple that defines the screen configuration specified by the user as the current view when the transition idiom was created, setting the P field of the second time-type transition tuple being generated to a value of 1.0, and setting the D field of the second time-type transition tuple being generated to the value specified by the user which dictates how long the aforementioned screen configuration that is to be switched to if the first transition tuple is executed is to be shown before switching back to the current view specified by the user when the transition idiom was created.

\* \* \* \* \*